(12) United States Patent
Hayakawa

(10) Patent No.: US 8,818,142 B2
(45) Date of Patent: Aug. 26, 2014

(54) OPTICAL SEMICONDUCTOR DEVICE

(75) Inventor: Akinori Hayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 13/363,093

(22) Filed: Jan. 31, 2012

(65) Prior Publication Data

US 2012/0243820 A1  Sep. 27, 2012

(30) Foreign Application Priority Data

Mar. 22, 2011  (JP) ................. 2011-062290

(51) Int. Cl.
*G02F 1/035* (2006.01)
*G02F 1/225* (2006.01)

(52) U.S. Cl.
CPC ............ *G02F 1/2255* (2013.01); *G02F 1/2257* (2013.01)
USPC ........................................ 385/3

(58) Field of Classification Search
None
See application file for complete search history.

(56) References Cited

U.S. PATENT DOCUMENTS

| | | | |
|---|---|---|---|
| 2009/0220185 A1 | 9/2009 | Wada et al. | |
| 2010/0142889 A1* | 6/2010 | Kwon et al. | 385/24 |
| 2013/0209021 A1* | 8/2013 | Hayashi et al. | 385/2 |
| 2013/0241756 A1* | 9/2013 | Sato, Kenji | 341/137 |
| 2014/0133794 A1* | 5/2014 | Kono | 385/3 |

FOREIGN PATENT DOCUMENTS

JP  2009-204884 A  9/2009

* cited by examiner

*Primary Examiner* — Sung Pak
(74) *Attorney, Agent, or Firm* — Fujitsu Patent Center

(57) ABSTRACT

An optical demultiplexer has first and second input ports and first and second output ports. When optical signal is introduced into the first input port, intensity of optical signal output from the first output port is equal to that from the second output port. When optical signal is introduced into the second input port, intensity of optical signal output from the first output port is larger than that from the second output port. An optical multiplexer has third and fourth input ports and third and fourth output ports. A first optical waveguide connects between the first output port and the third input port, while a second optical waveguide connects between the second output port and the fourth input port. Voltages applied to a first modulation electrode and a second modulation electrode work to cause changes in the optical path lengths of the first optical waveguide and the second optical waveguide.

10 Claims, 29 Drawing Sheets

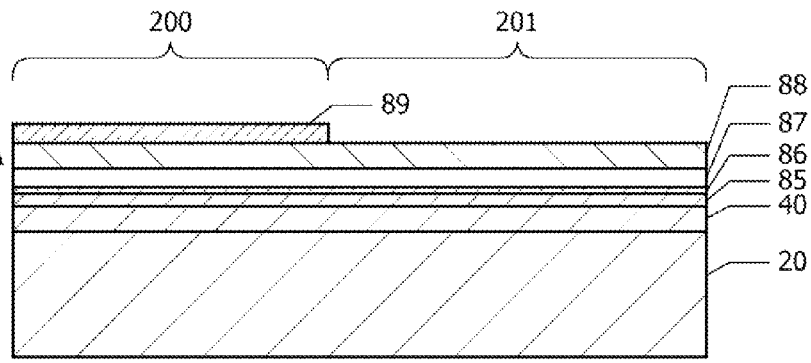
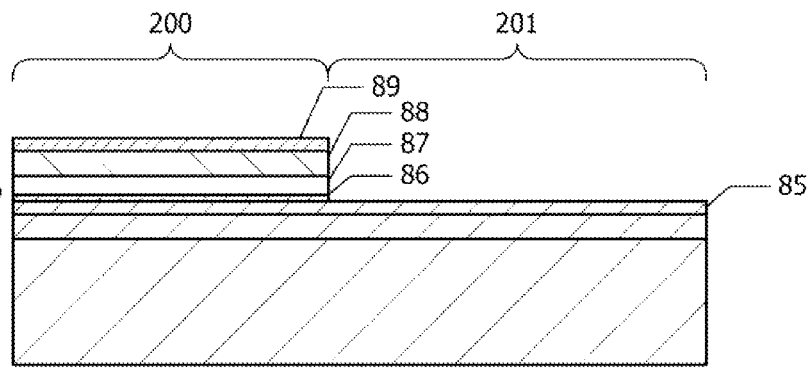
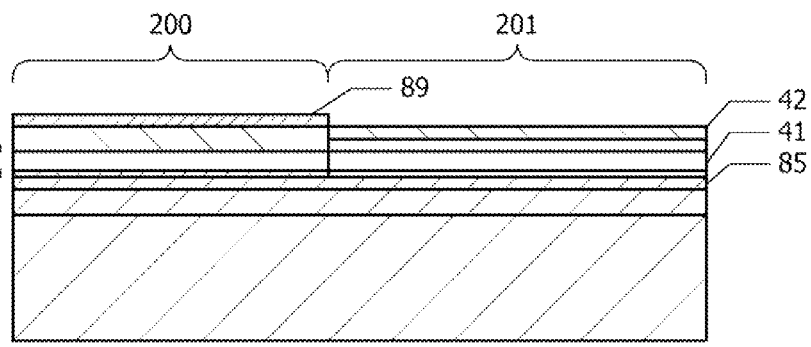

FIG. 14F1
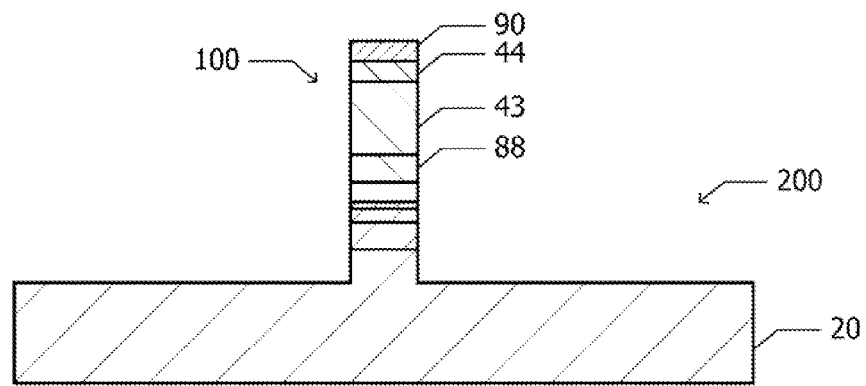
FIG. 14F2
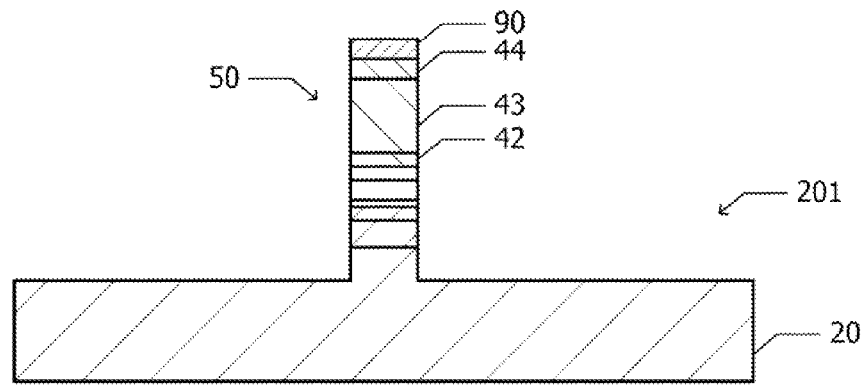

FIG. 14G1
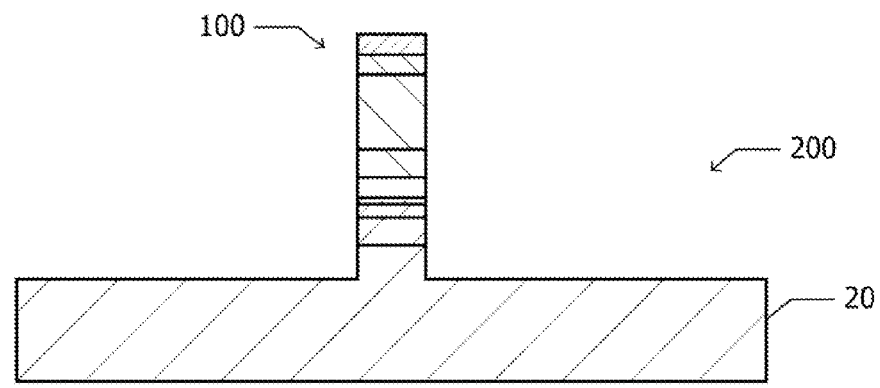
FIG. 14G2
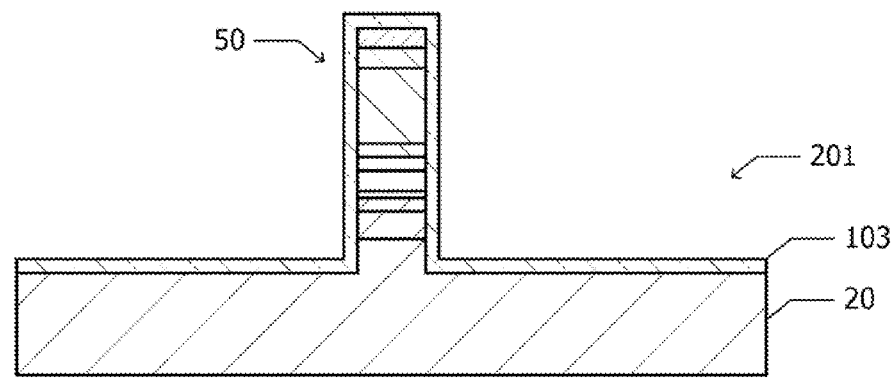

FIG. 14H1
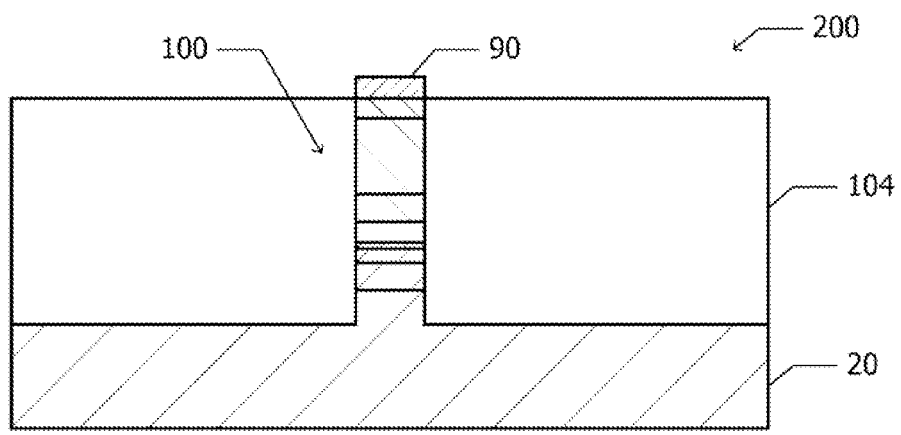
FIG. 14H2
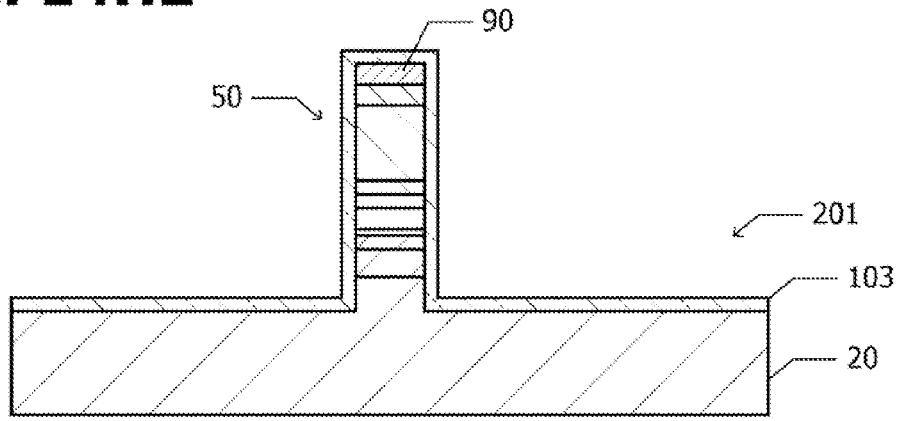

FIG. 14I1
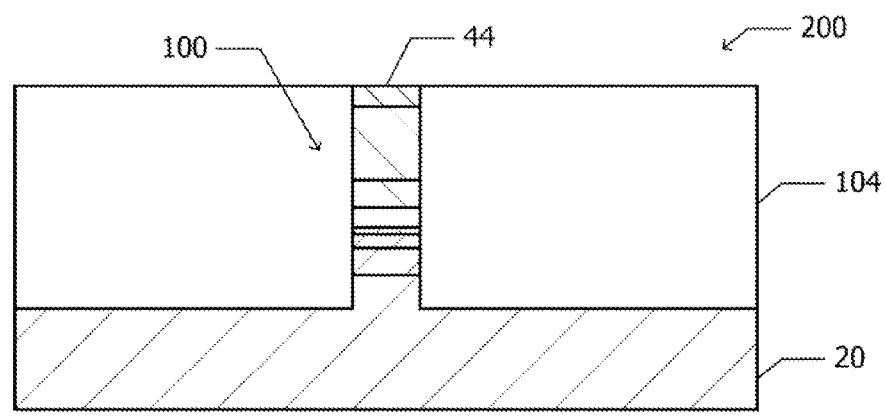
FIG. 14I2
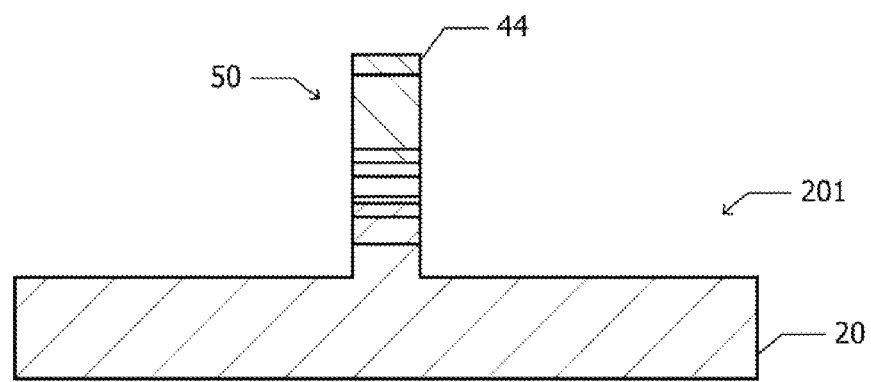

FIG. 14J1
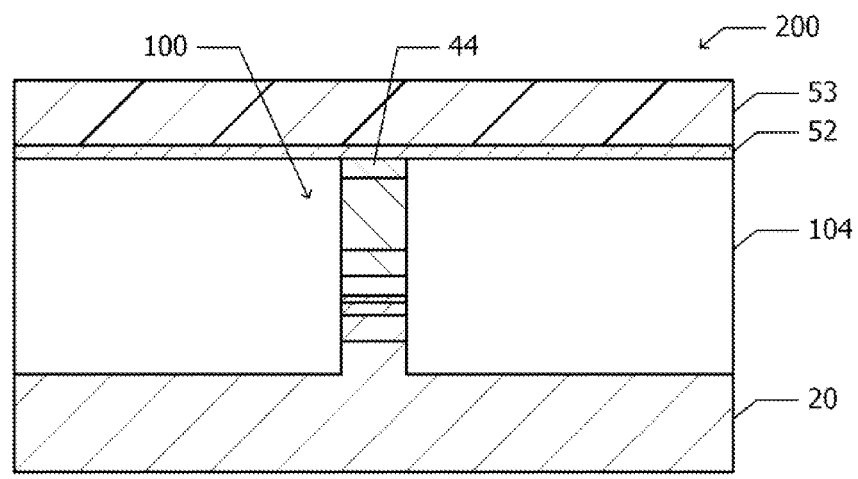
FIG. 14J2
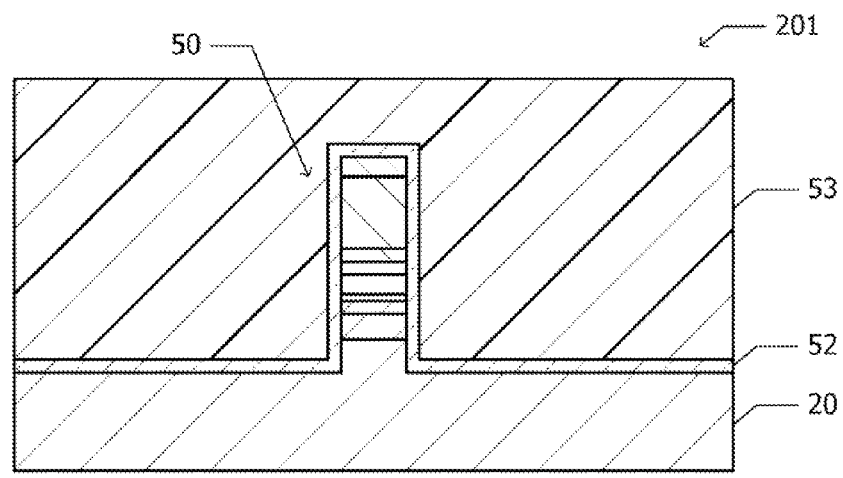

FIG. 14K1
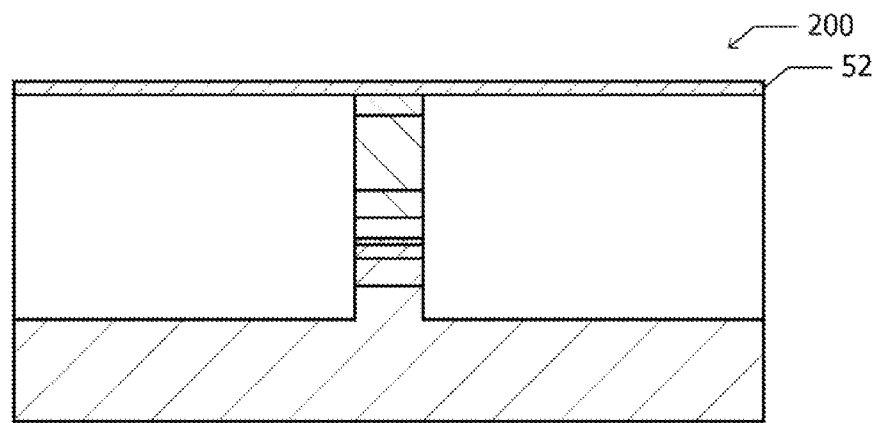
FIG. 14K2
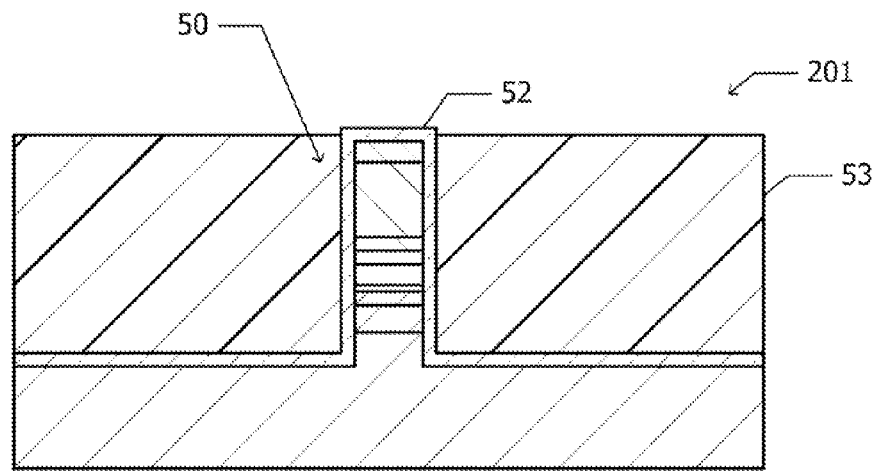

FIG. 14L1
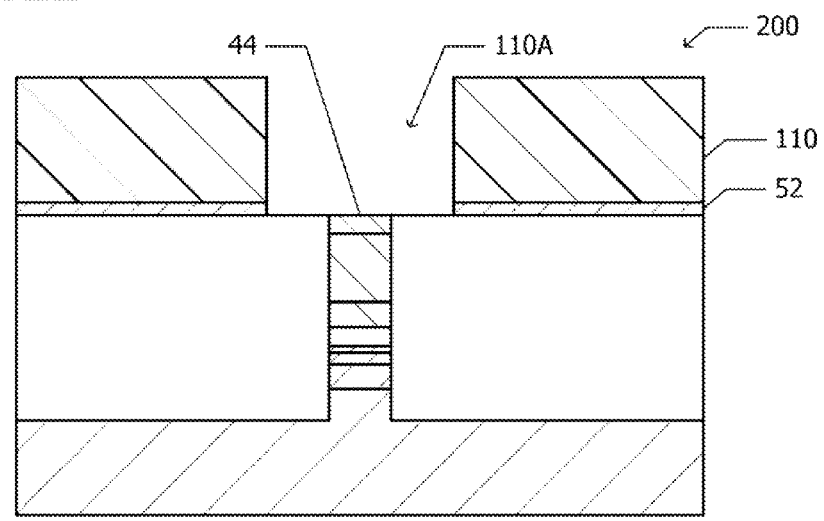
FIG. 14L2
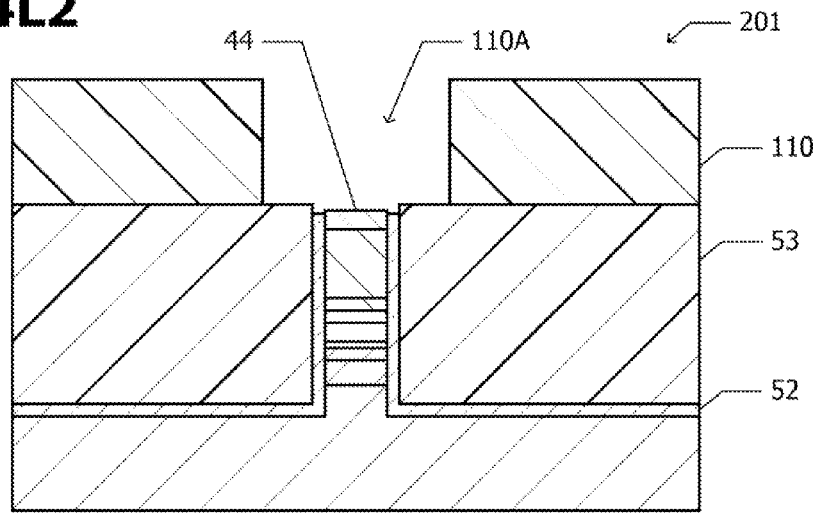

FIG. 14M1
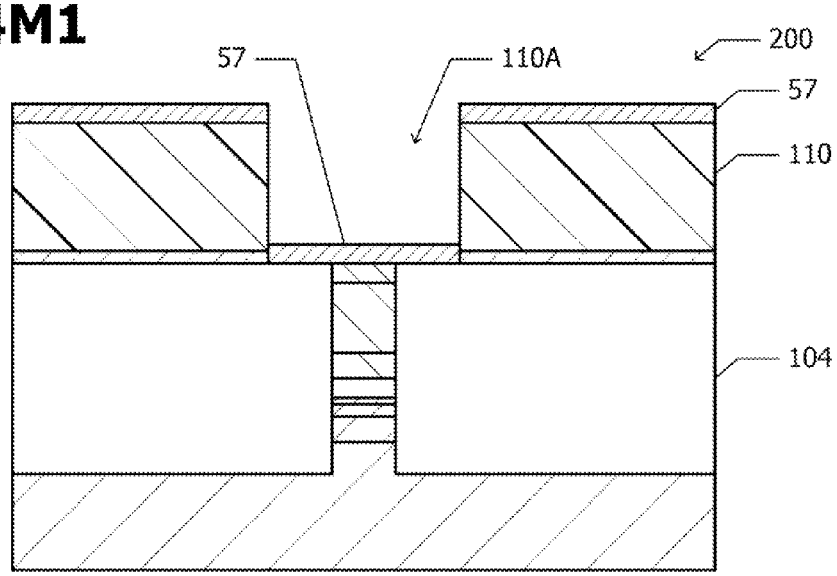
FIG. 14M2
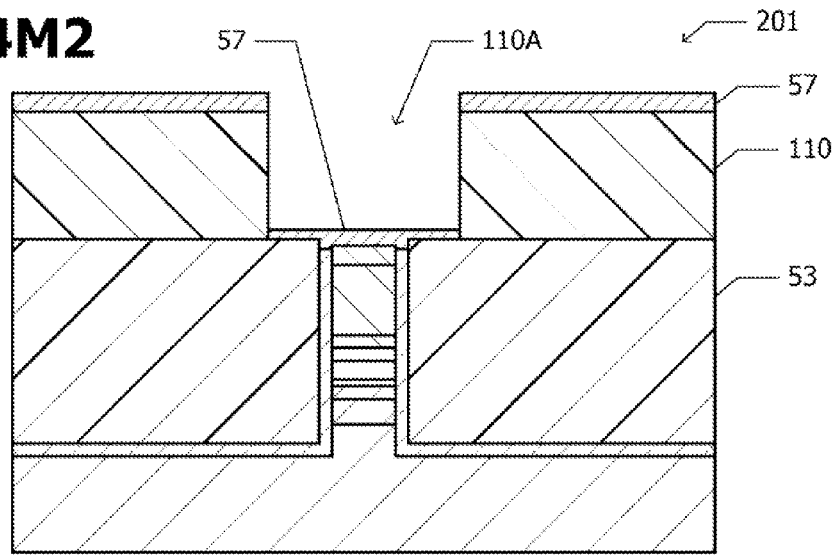

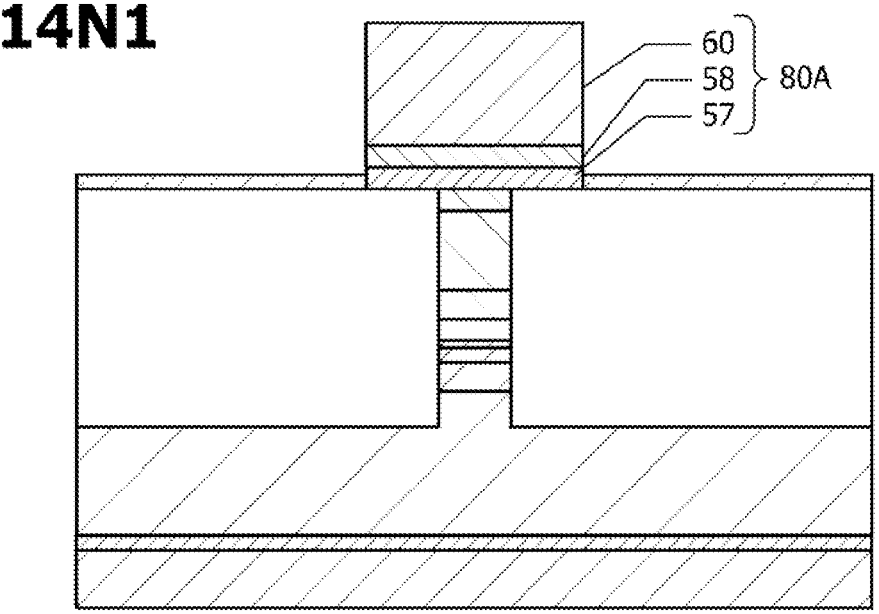
FIG. 14N1
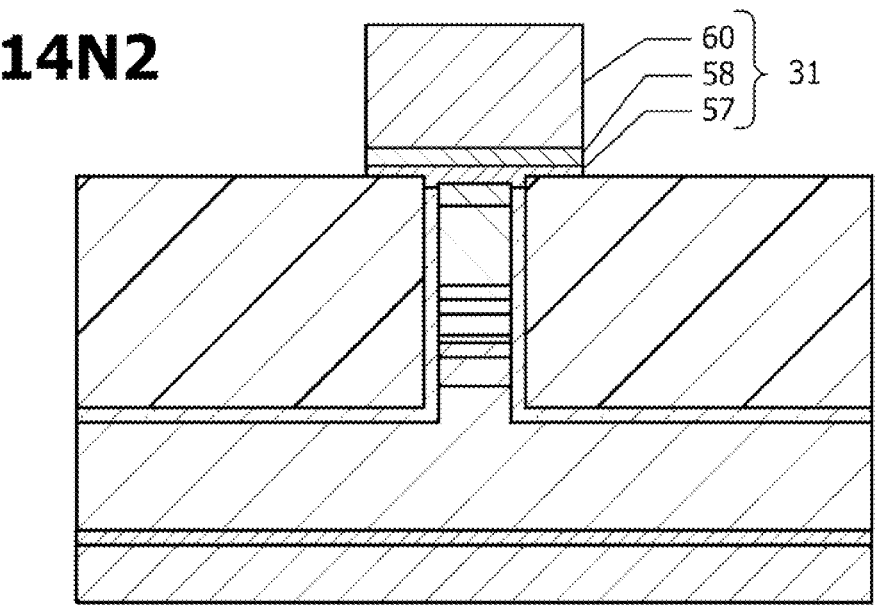
FIG. 14N2

OPTICAL SEMICONDUCTOR DEVICE

CROSS-REFERENCE TO RELATED APPLICATION

This application is based upon and claims the benefit of priority of the prior Japanese Patent Application No. 2011-062290, filed on Mar. 22, 2011, the entire contents of which are incorporated herein by reference.

FIELD

The embodiments discussed herein relate to an optical semiconductor device comprising a Mach-Zehnder optical modulator.

BACKGROUND

Chirp controllable Mach-Zehnder optical modulators comprising $LiNbO_3$ (LN-MZ modulators) are in wide use as a component of transmitters for optical communication systems. In recent years, there have been active efforts at development of semiconductor-based Mach-Zehnder optical modulators (semiconductor MZ modulators). A semiconductor MZ modulator can be formed on a semiconductor substrate, such as InP, GaAs, etc., which is used for a semiconductor laser serving as light source. This allows a light source and an optical modulator to be formed on one substrate. The change in refractive index caused by the quantum-confined Stark effect (QCSE) when an electric field is applied to a quantum well structure is larger than the change in refractive index caused by the electrooptical effect of $LiNbO_3$. Thus, the semiconductor MZ modulators are useful for developing small-sized modulators and reducing the driving voltage.

It has been proposed that a Mach-Zehnder optical modulator in which the core layers of the two arms have different thicknesses can operate under either negative or zero chirp conditions. When the absolute value of the bias voltage applied to the arm with the thinner core layer is set to be larger, negative chirp operation can be accomplished. On the contrary, when the absolute value of the bias voltage applied to the arm with the thinner core layer is set to be lower, zero chirp operation can be accomplished.

PRIOR ART DOCUMENTS

Japanese Laid-open Patent Publication No. 2009-204884

SUMMARY

Semiconductor MZ modulators are advantageous over LN-MZ modulators in terms of size reduction and low voltage operation, but they are disadvantageous against LN-MZ modulators in terms of chirp control. The refractive index changes nearly linearly with the applied voltage in the case of the electrooptical effect of $LiNbO_3$, but the refractive index changes nonlinearly, i.e. quadratically, in the case of QCSE. In addition, the optical loss changes only slightly with a change in applied voltage in the case of the electrooptical effect of $LiNbO_3$, but the optical loss increases with an increasing applied voltage in the case of QCSE.

Modulation having a parameter a of 0 (zero chirp modulation) or modulation having the parameter a of about −0.7 (negative chirp modulation) is required to the MZ modulator for optical communications. In the devices based on the prior art described above, the two arms must have core layers with different thicknesses to drive one semiconductor MZ modulator with both zero chirp modulation and negative chirp modulation. Accordingly, complicated production steps are required.

In a semiconductor MZ modulator in which the optical waveguides constituting the two arms have the same layered structure, zero chirp modulation can be performed by causing the same phase shift in the two arms. Specifically, this is achieved when the amplitudes and the center voltages of the applied modulation signals are the same for the two arms. When the center voltages of the applied signals are the same for the two arms, the same signal losses take place for the optical signals propagating in the two arms. This serves to ensure good extinction characteristics.

Negative chirp modulation can be performed by causing different phase shifts in the two arms. Different phase shifts can be caused by applying modulation signals of different amplitudes to the two arms. For this technique, however, two driver circuits are separately required for zero chirp modulation and negative chirp modulation. Different phase shifts can also be caused by using two arms with different lengths. For this technique, however, both of zero chirp modulation and negative chirp modulation cannot be performed in one modulation device.

Optical semiconductor devices that can easily perform both zero chirp modulation and negative chirp modulation are expected.

According to an aspect of the invention, an optical semiconductor device including:

an optical demultiplexer having a first and a second input ports and a first and a second output ports wherein intensity of an optical signal that is output from the first output port and an optical signal that is output from the second output port are equal to each other when an optical signal is introduced into the first input port whereas intensity of an optical signal that is output from the first output port is larger than intensity of an optical signal that is output from the second output port when an optical signal is introduced into the second input port;

an optical multiplexer having a third and a fourth input ports and a third and a fourth output ports;

a first optical waveguide of semiconductor to connect the first output port to the third input port;

a second optical waveguide of semiconductor to connect the second output port to the fourth input port;

a first modulation electrode to apply an electric field to the first optical waveguide so as to cause changes in the optical path length of the first optical waveguide; and a second modulation electrode to apply an electric field to the second optical waveguide so as to cause changes in the optical path length of the second optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A to 2L are cross sectional views of an optical semiconductor device during manufacture according to Embodiment 1.

FIGS. 14A to 14E, 14F1, 14F2 to 14N1, and 14N2 are cross sections that illustrate an optical semiconductor device according to Embodiment 3 during manufacture.

DESCRIPTION OF EMBODIMENTS

The optical semiconductor devices according to Embodiments 1 to 4 are described below with reference to drawings.

Embodiment 1

Figure 1:
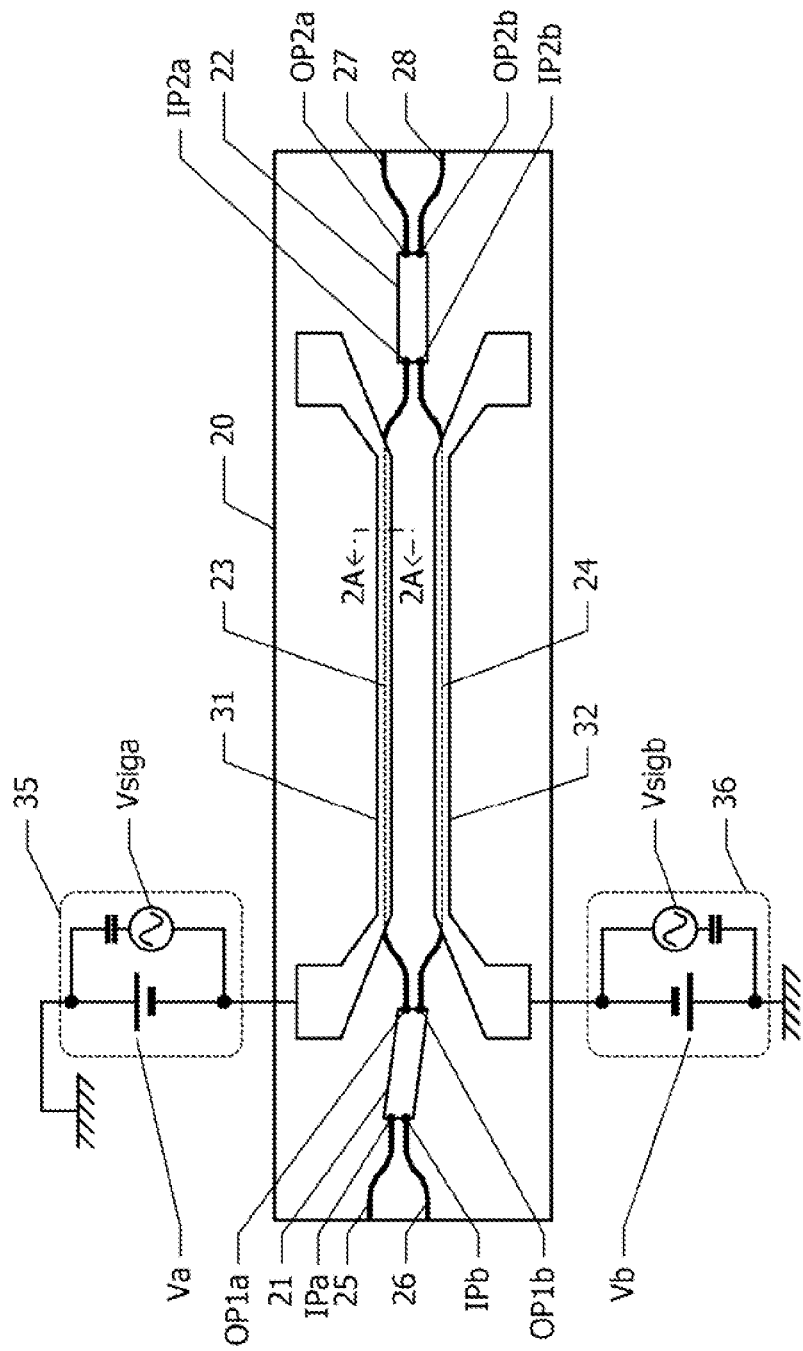
FIG. 1 is a plan view of an optical semiconductor device according to Embodiment 1.

FIG. 1 is a plan view of an optical semiconductor device according to Embodiment 1. An optical demultiplexer 21 and an optical multiplexer 22 are formed on a substrate 20. The optical demultiplexer 21 and the optical multiplexer 22 comprise a multimode interference (MMI) waveguide with two input ports and two output ports. A first input port IPa, second input port IPb, first output port OP1a, and second output port OP1b are defined on the optical demultiplexer 21. A third input port IP2a, fourth input port IP2b, third output port OP2a, and fourth output port OP2b are defined on the optical multiplexer 22.

In addition, a first optical waveguide 23 and a second optical waveguide 24 are formed on the substrate 20. The first optical waveguide 23 connects between the first output port OP1a and the third input port IP2a, while the second optical waveguide 24 connects between the second output port OP1b and the fourth input port IP2b. A first input waveguide 25 and a second input waveguide 26 are connected to the first input port IPa and the second input port IPb, respectively. A first output waveguide 27 and a second output waveguide 28 are connected to the third output port OP2a and the fourth output port OP2b, respectively. The first optical waveguide 23 and the second optical waveguide 24 serve as the two arms of a Mach-Zehnder modulator.

These waveguides and multimode interference waveguides have the same layered structure. The first optical waveguide 23 has the same physical waveguide length as that of the second optical waveguide 24.

A first modulation electrode 31 and a second modulation electrode 32 are formed on top of the first optical waveguide 23 and the second optical waveguide 24, respectively. A first driver circuit 35 and a second driver circuit 36 give modulation signals to the first modulation electrode 31 and the second modulation electrode 32, respectively. The modulation signals provided by the first driver circuit 35 consist of a direct current bias voltage Va superimposed with a modulation voltage Vsiga. The modulation signals provided by the second driver circuit 36 consist of a direct current bias voltage Vb superimposed with a modulation voltage Vsigb.

Modulation signals are given to the first modulation electrode 31 and the second modulation electrode 32 to cause changes in the refractive index of the first optical waveguide 23 and the second optical waveguide 24, respectively, due to an electrooptical effect, leading to changes in their optical path lengths.

A method for manufacturing the optical semiconductor device according to Embodiment 1 is described below with reference to FIGS. 2A to 2L. FIGS. 2A to 2L illustrate cross sections along the dashed-dotted line 2A-2A defined in FIG. 1.

Figure 2A:
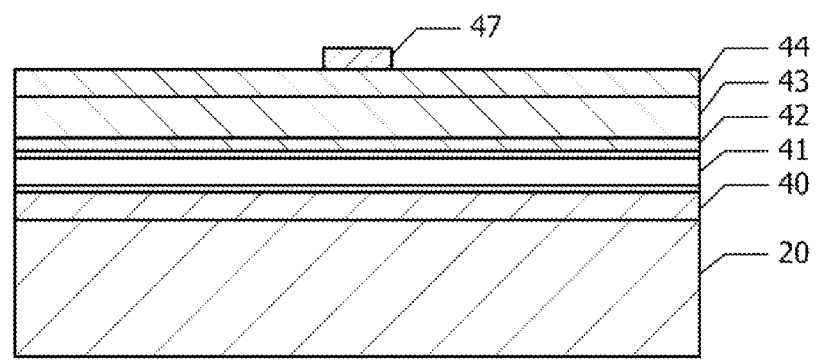

As illustrated in FIG. 2A, a lower cladding layer 40 with a thickness of 200 nm is grown epitaxially on the substrate 20 of n-type InP. On the cladding layer 40, a core layer 41, an upper first cladding layer 42 with a thickness of 100 nm, an upper second cladding layer 43 with a thickness of 1,500 nm, and a contact layer 44 with a thickness of 300 nm are grown epitaxially in the recited order. Metal-organic chemical vapor deposition (MO-CVD), for instance, may be applied to the formation of these semiconductor layers.

The lower cladding layer 40 is made, for instance, of n-type InP with a dopant concentration of $5 \times 10^{17}$ cm$^{-3}$. The core layer 41 consists of an undoped InP layer with a thickness of 50 nm, a multiple quantum well (MQW) layer, and an undoped InP layer with a thickness of 100 nm formed in the recited order from the substrate. The MQW layer has a layered structure consisting of 14 InP barrier layers each with a thickness of 5 nm and 13 InGaAsP well layers each with a thickness of 10 nm that are stacked alternately. The well layer is designed to have an interband transition wavelength of 1,400 nm. The MQW layer has a thickness of 200 nm.

The upper first cladding layer 42 is made, for instance, of p-type InP with a dopant concentration of $6.5 \times 10^{17}$ cm$^{-3}$. The upper second cladding layer 43 is made, for instance, of p-type InP with a dopant concentration of $1.6 \times 10^{18}$ cm$^{-3}$. The contact layer 44 is made, for instance, of p-type InGaAs with a dopant concentration of $1.5 \times 10^{19}$ cm$^{-3}$.

A mask pattern 47 of silicon oxide is formed on a part of the contact layer 44. The mask pattern 47 has a planar shape corresponding to that of the first and the second input waveguide 25 and 26, the optical demultiplexer 21, the first and the second optical waveguide 23 and 24, the optical multiplexer 22, and the first and the second output waveguide 27 and 28 described in FIG. 1.

Figure 2B:
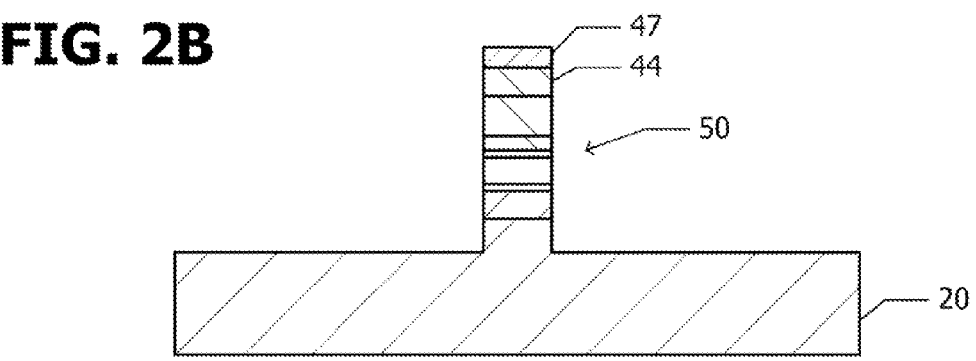
Figure 2B:
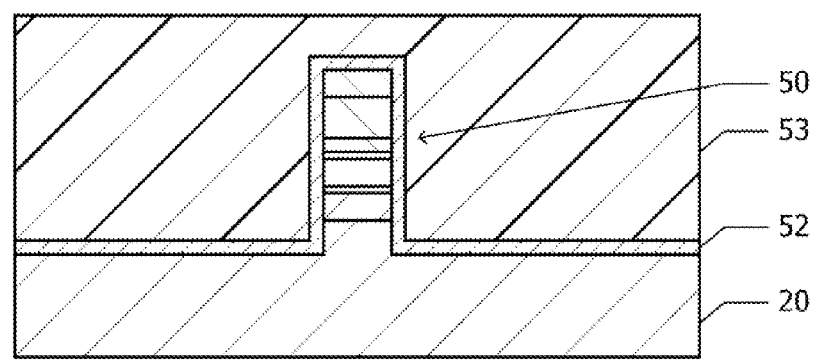

As illustrated in FIG. 2B, the layers from the contact layer 44 down to the surface layer of the substrate 20 are etched using the mask pattern 47 as an etching mask. This etching is carried out by, for instance, the reactive ion etching using inductively-coupled plasma (ICP-RIE). Consequently, a mesa structure 50 with a height of about 3 μm is formed. After the formation of the mesa structure 50, the mask pattern 47 is removed with a hydrofluoric acid based etchant.

As illustrated in FIG. 2C, the surfaces of the substrate 20 and the mesa structure 50 are covered with a passivation film 52 of such material as silicon oxide. The formation of the passivation film 52 is carried out by, for instance, chemical vapor deposition (CVD). An embedding material 53 is formed on the passivation film 52 by an appropriate technique such as spin coating. The space lateral to the mesa structure 50 is filled with the embedding material 53. The embedding material 53 is formed also on the mesa structure 50. Material having a low-dielectric constant substance, such as benzocyclobutene (BCB), polyimide based organic compound, epoxy based organic compound, and acrylic organic compound, which has a dielectric constant lower than that of semiconductors is used as the embedding material 53. The mesa structure 50, which contains the core layer 41 and the low-dielectric embedding material 53, which fill the space lateral to the mesa structure 50 constitute an optical waveguide having a high-mesa structure. The space lateral to the mesa structure 50 may be filled with air instead of the embedding material 53.

Figure 2D:
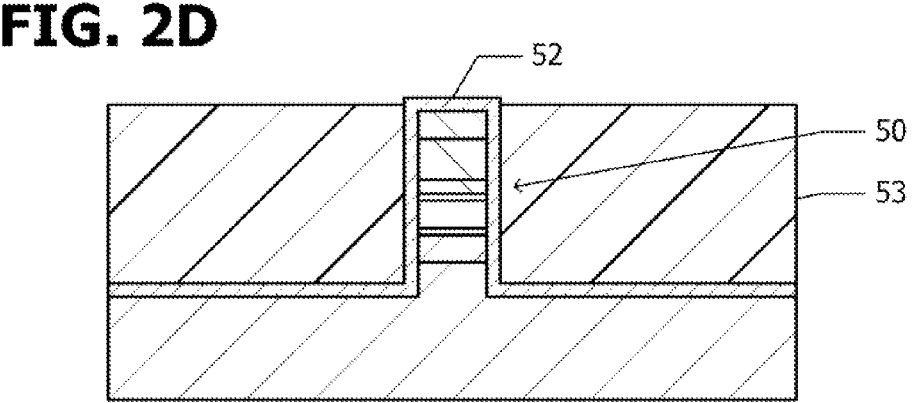

As illustrated in FIG. 2D, the embedding material 53 is etched back by a technique such as RIE to expose the passivation film 52 that covers the top face of the mesa structure 50. The embedding material 53 is left in the space lateral to the mesa structure 50.

Figure 2E:
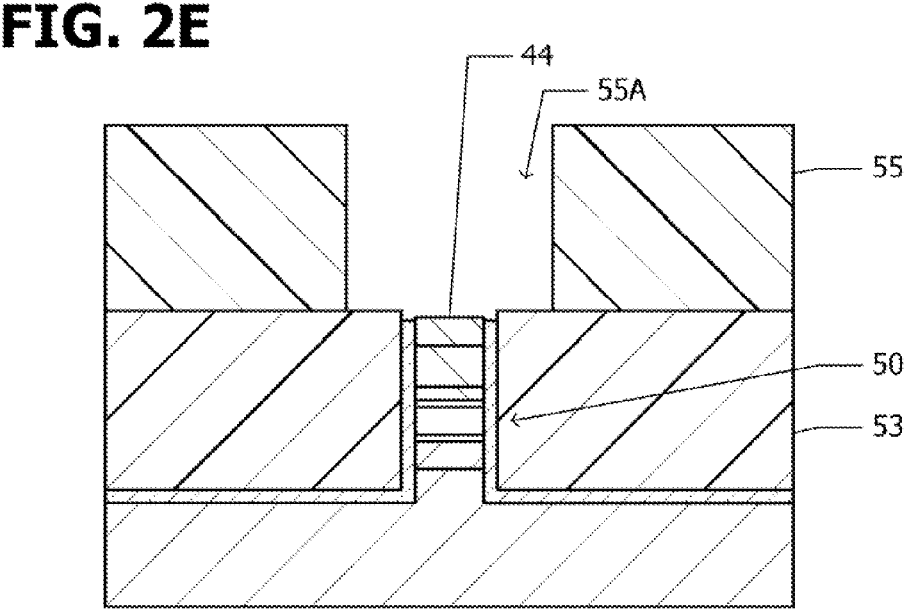

As illustrated in FIG. 2E, a resist film 55 is formed on the embedding material 53 and the exposed surface of the passivation film 52 (FIG. 2D). An opening 55A is formed in the resist film 55. The opening 55A has a planar shape corresponding to that of the first and the second modulation electrode 31 and 32 illustrated in FIG. 1. The passivation film 52 exposed at the bottom of the opening 55A is removed by wet etching. Consequently, the contact layer 44, which is the top layer of the mesa structure 50, is exposed.

Figure 2F:
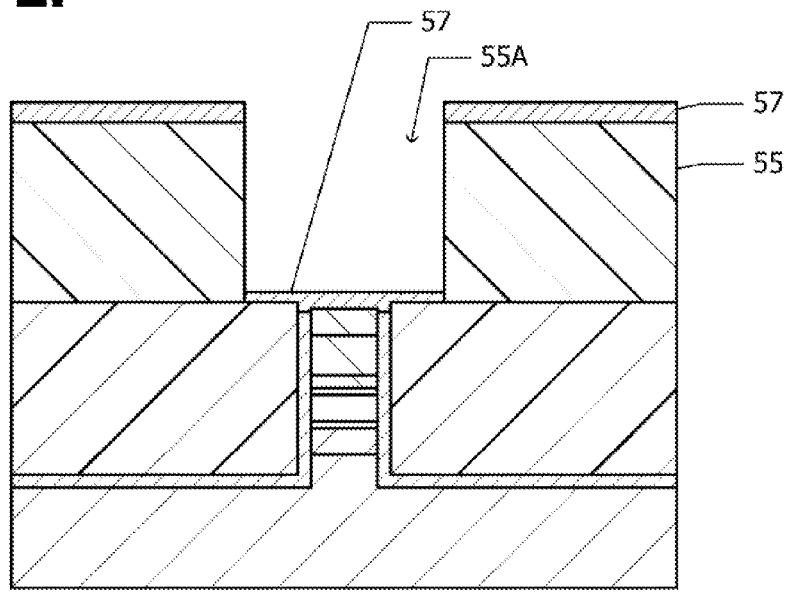

As illustrated in FIG. 2F, an electrically conductive film 57 is formed on the resist film 55 and the bottom face of the opening 55A. The electrically conductive film 57 has, for instance, an Au/Zn/Au three layer structure that is formed by vacuum deposition.

Figure 2G:
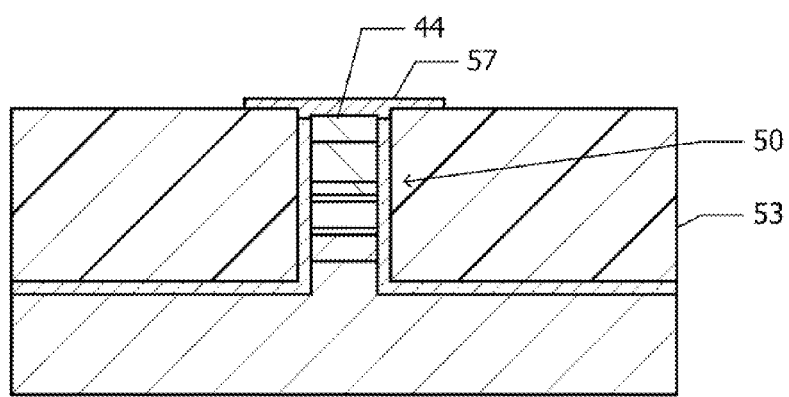

As illustrated in FIG. 2G, the resist film 55 (FIG. 2F) is removed along with the electrically conductive film 57 deposited thereon. Thus, the electrically conductive film 57 is left on the mesa structure 50.

Figure 2H:
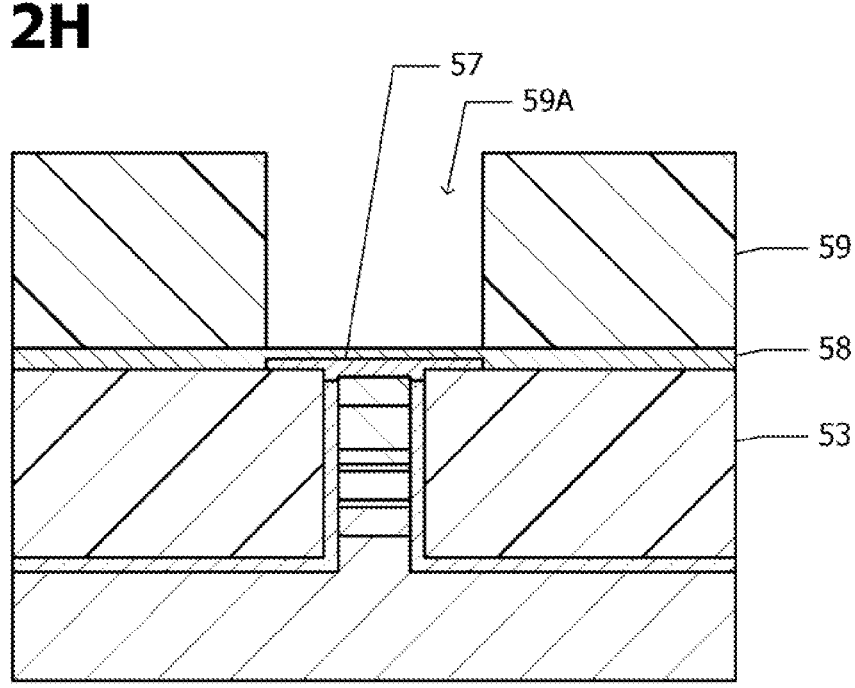

As illustrated in FIG. 2H, a seed layer 58 is formed on the embedding material 53 and the electrically conductive film 57. The seed layer 58 has, for instance, a Ti/Pt/Au three layer structure that is formed by sputtering. A resist film 59 is formed on the seed layer 58, and an opening 59A is formed in this resist film 59. The opening 59A has a planar shape corresponding to that of the first and the second modulation electrode 31 and 32 illustrated in FIG. 1.

Figure 2I:
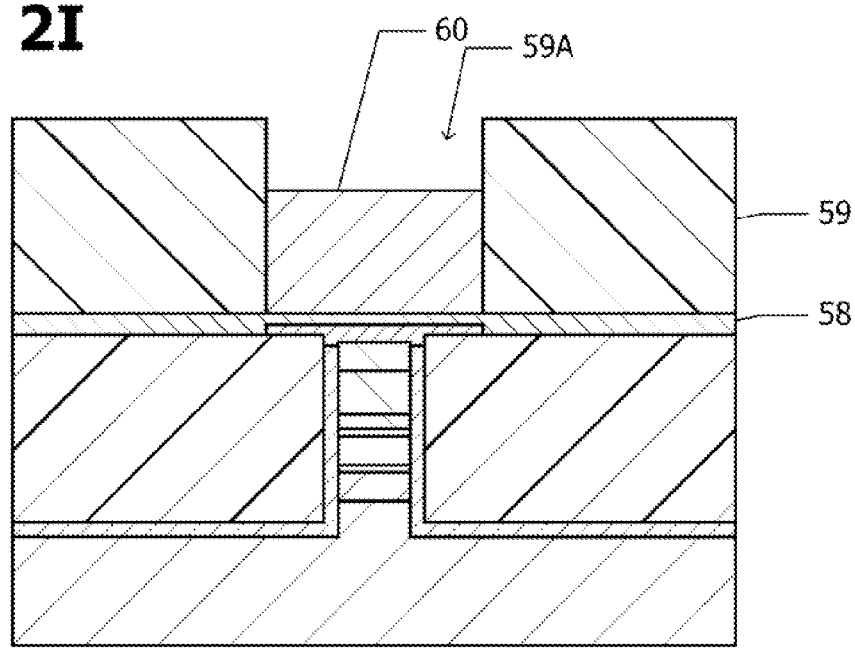

As illustrated in FIG. 2I, an Au film 60 is formed on the bottom face of the opening 59A by gold plating.

Figure 2J:
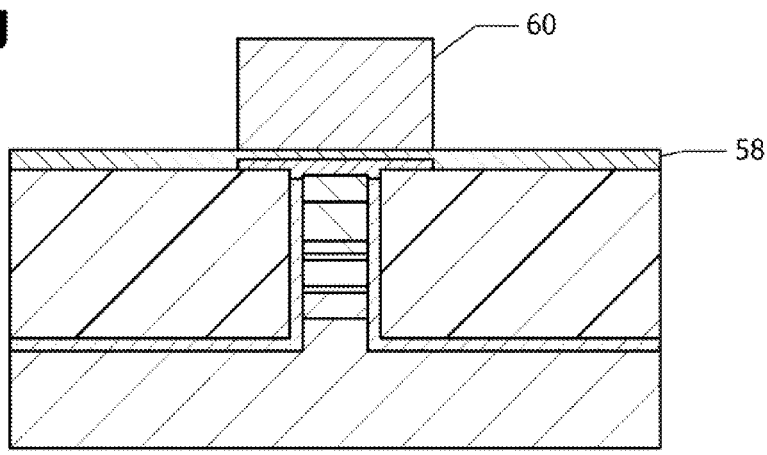

As illustrated in FIG. 2J, the resist film 59 (FIG. 2I) is removed. The seed layer 58 is exposed in the portion where the Au film 60 has not been formed.

Figure 2K:
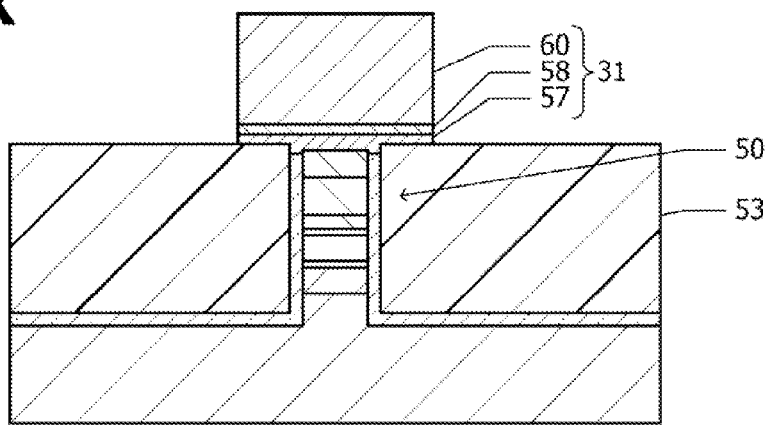

As illustrated in FIG. 2K, the entire surface is dry-etched to remove the exposed portions of the seed layer 58 (FIG. 2J). Consequently, the embedding material 53 is exposed. Thus, the first modulation electrode 31 consisting of the electrically conductive film 57, the seed layer 58, and the Au film 60 is formed on the mesa structure 50. Simultaneously, the second modulation electrode 32 (FIG. 1) is also formed.

Figure 2L:
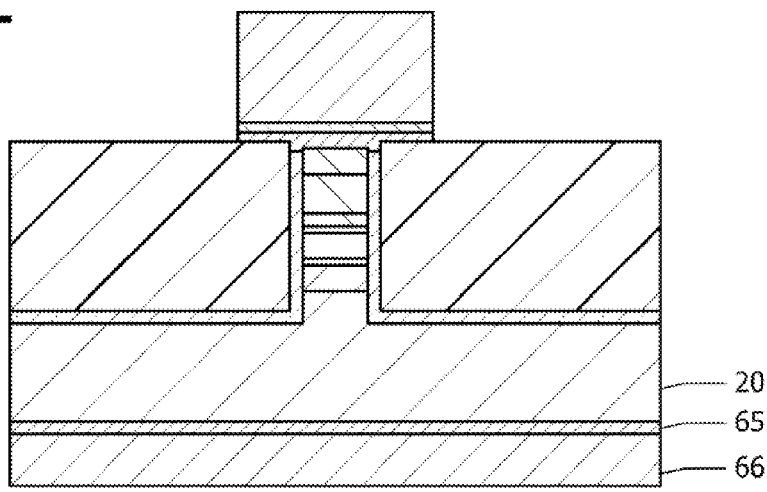

As illustrated in FIG. 2L, the back face of the substrate 20 is polished so that the thickness of the device reaches 150 μm. An electrically conductive film 65 with a two layered AuGe/Au structure is formed on the polished back face of the substrate 20. After patterning the electrically conductive film 65, an Au film 66 is formed by gold plating. The electrically conductive film 65 and the Au film 66 constitute a back electrode.

Figure 3A:
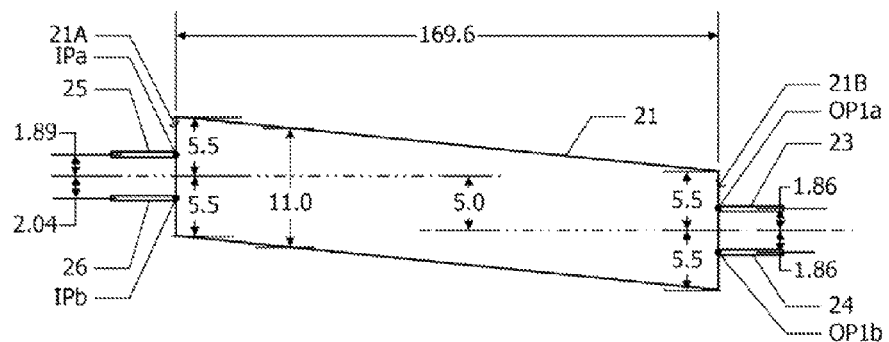
FIGS. 3A to 3C are plan views of an optical demultiplexer.

FIG. 3A is a typical plan view of the optical demultiplexer 21. The planar shape of the optical demultiplexer 21 is a parallelogram apex angles of which are not right-angles. This parallelogram has a short side length of 11.0 μm, and the height from a short side to the other short side is 169.6 μm.

The first input port IPa and the second input port IPb are located on one short side (input side) 21A, while the first output port OP1a and the second output port OP1b are located on the other short side (output side) 21B. The direction from the first input port IPa towards the second input port IPb is the same as the direction from the first output port OP1a towards the second output port OP1b.

The center of the output side 21B is offset from the center of the input side 21A in the direction from the first output port OP1a towards the second output port OP1b, and the size of the offset is 5.0 μm. The first input port IPa and the second input port IPb are located away from the center of the input side 21A in the opposite directions, and the distance from the center to the first input port IPa and that from the center to the second input port IPb are 1.89 μm and 2.04 μm, respectively. The first output port OP1a and the second output port OP1b are located away from the center of the output side 21B in the opposite directions, and the distance from the center to the first output port OP1a and that from the center to the second output port OP1b are both 1.86 μm. Thus, the first output port OP1a and the second output port OP1b are offset from the lines extended from the first input port IPa and the second input port IPb, respectively, in the direction perpendicular to the input side 21A.

Figure 3B:
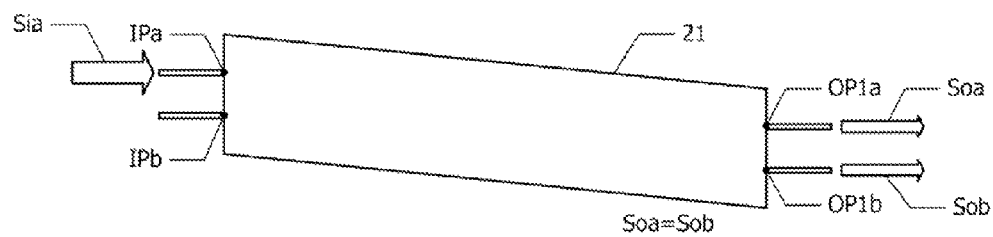

As illustrated in FIG. 3B, when the optical signal Sia is introduced into the optical demultiplexer 21 through the first input port IPa, the intensity of the optical signal Soa coming out from the first output port OP1a is nearly equal to the intensity of the optical signal Sob coming out from the second output port OP1b.

Figure 3C:
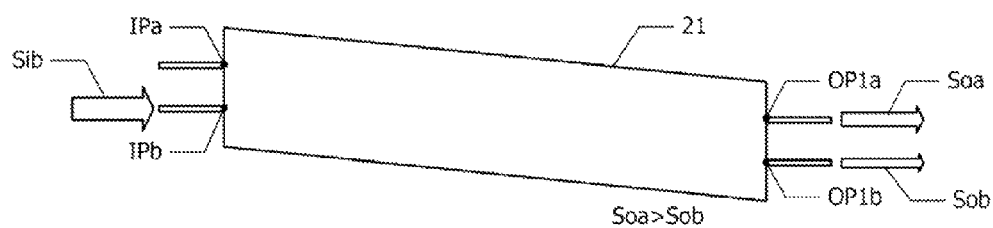

As illustrated in FIG. 3C, when the optical signal Sib is introduced into the optical demultiplexer 21 through the second input port IPb, the intensity of the optical signal Soa coming out from the first output port OP1a is higher than the intensity of the optical signal Sob coming out from the second output port OP1b. In the case given in FIG. 3C, the ratio of the intensity of the optical signal Soa to that of the optical signal Sob is 52.5:47.5. Thus, the intensity of the optical signal Soa with reference to the intensity of the optical signal Sob (intensity ratio) is about 0.4 dB.

Figure 4:
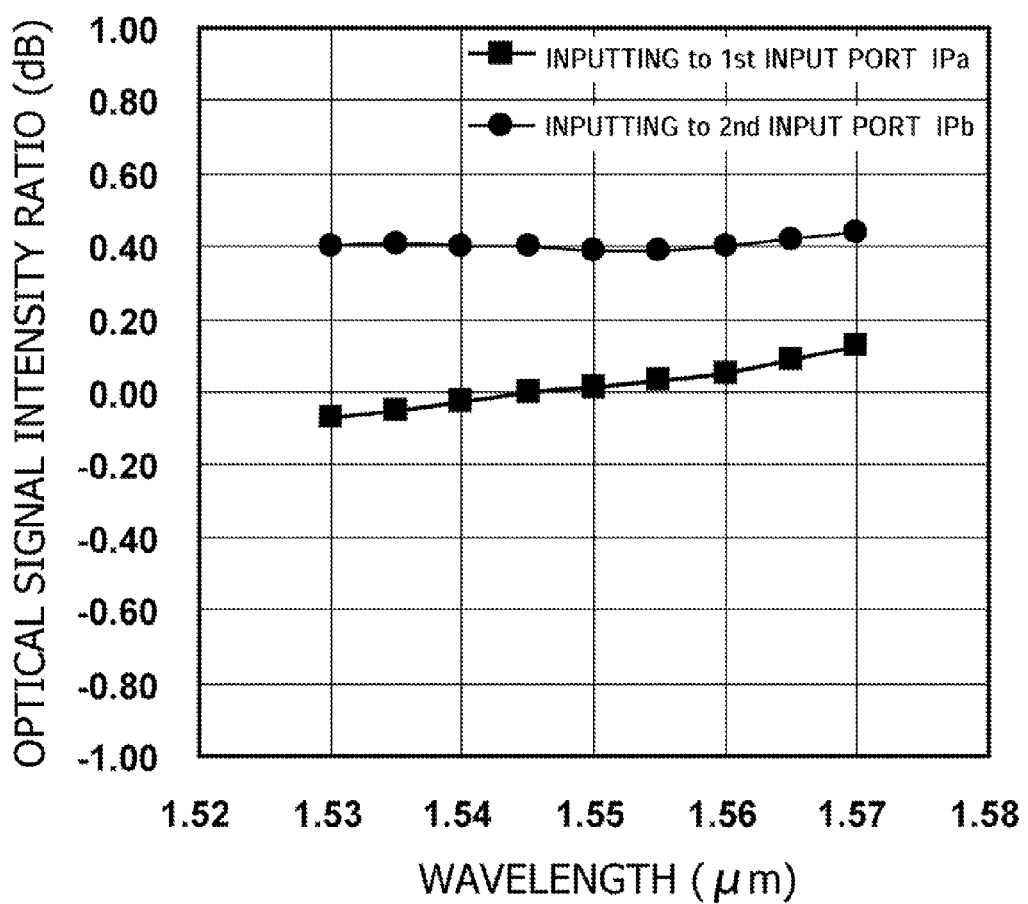
FIG. 4 is a graph illustrating the wavelength dependency of the intensity ratio between the optical signals output from the two output ports of the optical demultiplexer.

FIG. 4 illustrates the wavelength dependency of the intensity ratio of the optical signal Soa to the optical signal Sob. The horizontal axis represents the wavelength in the unit of "μm" and the longitudinal axis represents the intensity of the optical signal Soa with reference to the intensity of the optical signal Sob (intensity ratio) in the unit of "dB". The squares and circles represent the intensity ratios in the cases where optical signal is introduced into the first input port IPa and the second input port IPb, respectively.

When the optical signal is introduced into the second input port IPb, the intensity ratio of the optical signal is nearly 0.4 dB in the wavelength range of 1.53 μm to 1.57 μm. When the optical signal is introduced into the first input port IPa, on the other hand, the intensity ratio falls within the range of −0.05 dB to 0.15 dB in the wavelength range of 1.53 μm to 1.57 μm. Thus, the intended intensity ratio is almost achieved in the c-band range.

The planar shape of the optical demultiplexer 21 illustrated in FIG. 3A is only an example, and other shapes may be adopted if their characteristics are equivalent to those illustrated in FIG. 4 in terms of the wavelength dependency of the intensity ratio.

Figure 5:
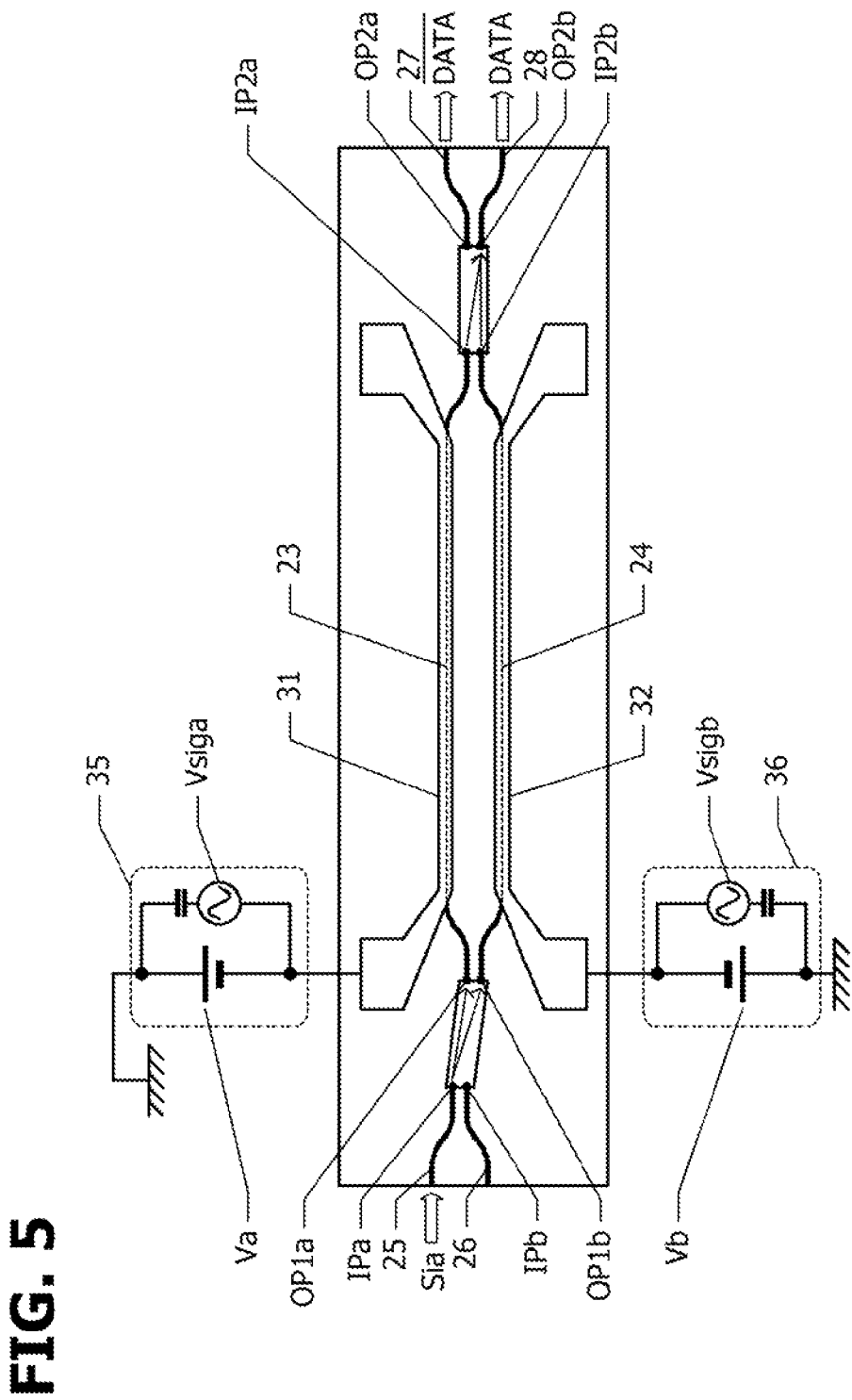
FIG. 5 is a plan view that illustrates a path of the optical signal propagation in the optical semiconductor device according to Embodiment 1 during operation with zero chirp modulation.
Figure 6:
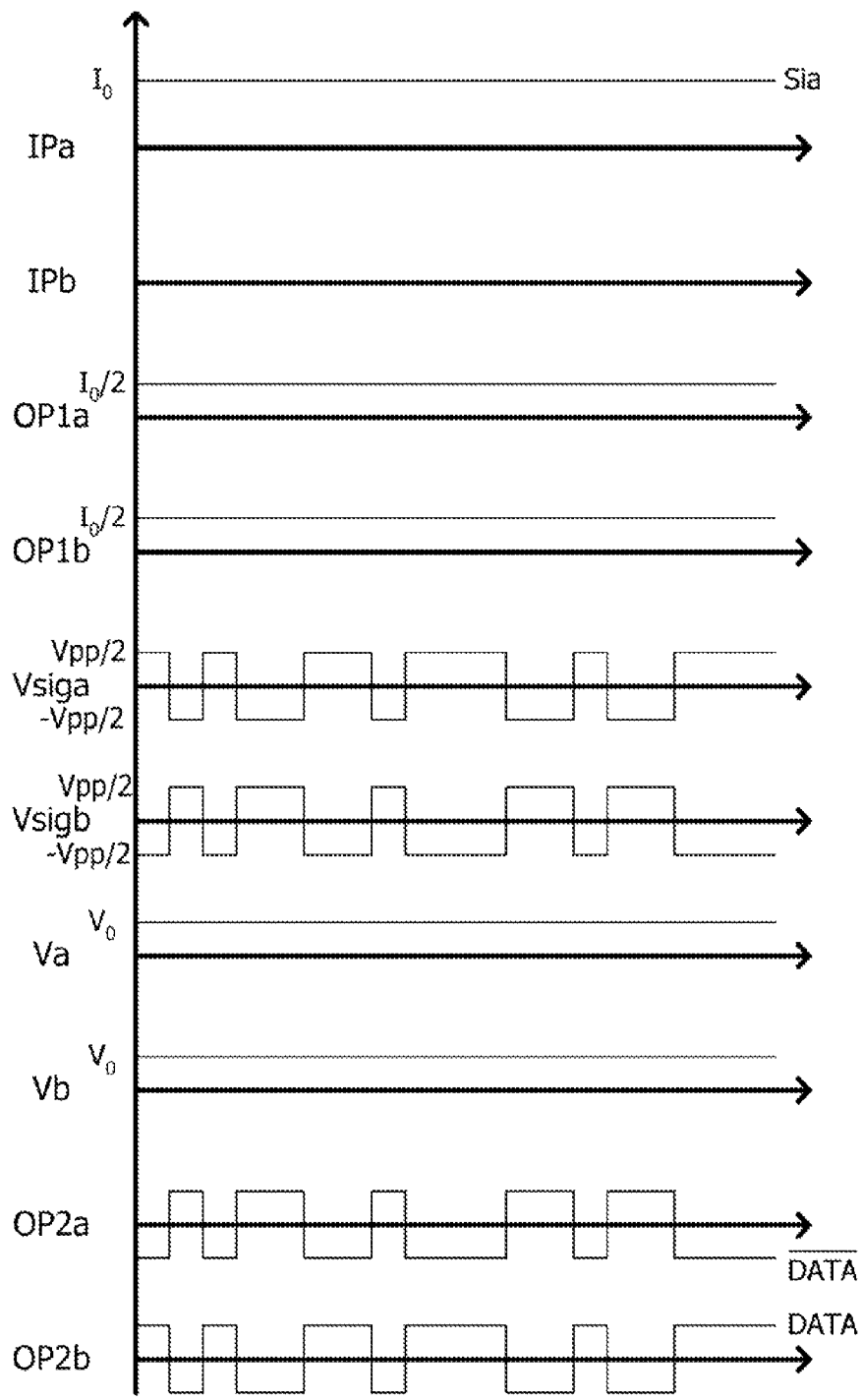
FIG. 6 is a timing chart of modulation signals and the optical signals in the optical semiconductor device according to Embodiment 1 during operation with zero chirp modulation.

FIG. 5 illustrates a path of the propagation of the optical signal in the case of zero chirp modulation, and FIG. 6 illustrates a timing chart for the optical signals and modulated signals. The optical signal Sia is introduced into the first input port IPa through the first input waveguide 25. No optical signal is introduced into the second input port IPb. The intensity of the optical signal Sia is denoted by $I_0$.

Optical signals each of which has intensity of $I_0/2$ come out from both the first output port OP1a and the second output port OP1b. The DC bias voltages Va and Vb are equal to each other and they are both $V_0$. The modulation voltages Vsiga and Vsigb are alternating voltages in mutually opposite phases with the same amplitude Vpp.

The fourth output port OP2b outputs optical signal DATA. The third output port OP2a outputs inversion signal (overbar of DATA) of the optical signal DATA.

Figure 7A:
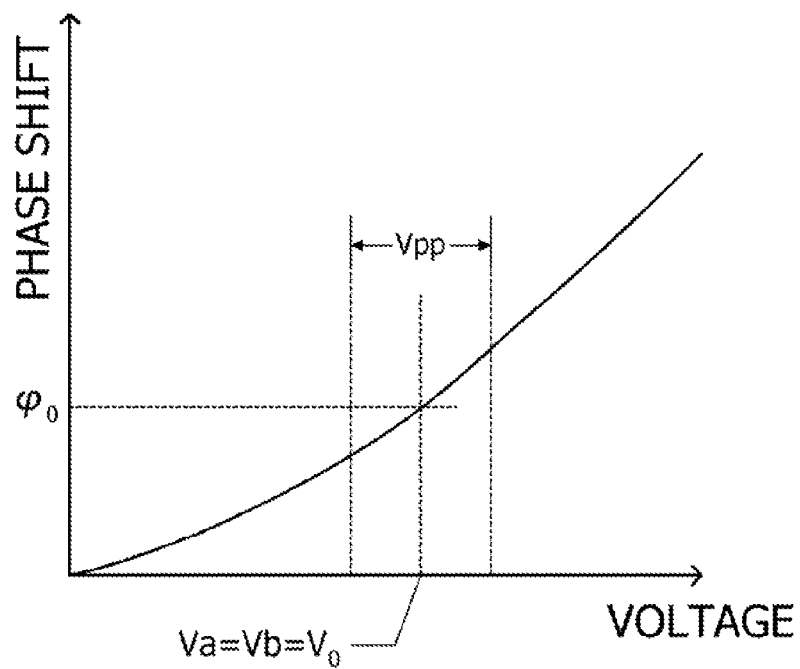
FIG. 7A is a graph illustrating the voltage dependency of the phase shifts in the first and the second optical waveguide during operation with zero chirp modulation.
Figure 7B:
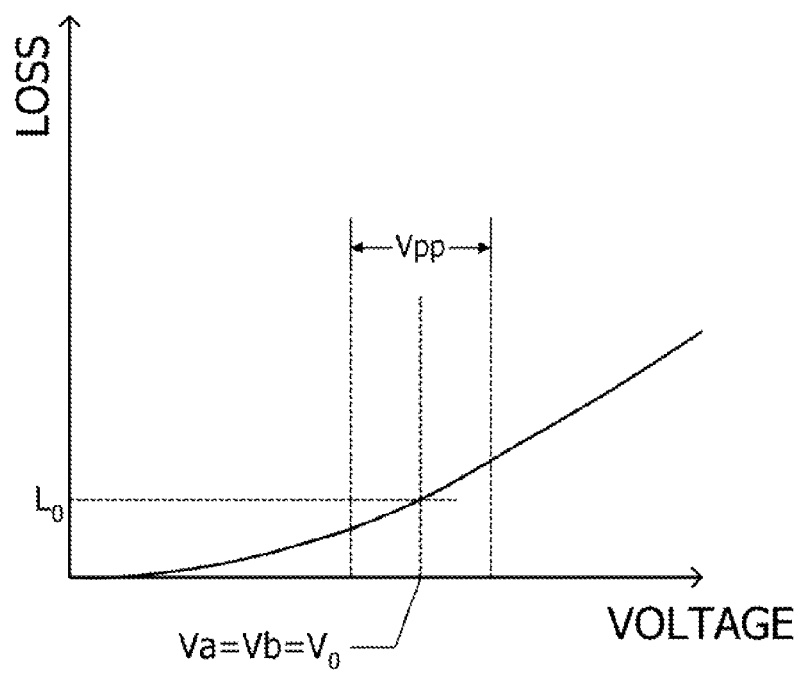
FIG. 7B is a graph illustrating the voltage dependency of the optical loss.

FIG. 7A illustrates typical phase shift in the first optical waveguide 23 and the second optical waveguide 24 with reference to the voltage-free state. FIG. 7B illustrates a typical optical loss in the first optical waveguide 23 and the second optical waveguide 24. The phase shift increases with the applied voltage according to a quadratic function. The optical loss increases with an increasing applied voltage.

The DC bias voltage Va applied to the first modulation electrode 31 and the DC bias voltage Vb applied to the second modulation electrode 32 are both $V_0$. The phase shift that is caused when a DC bias voltage of $V_0$ is applied is denoted by $\phi_0$. The modulation voltage Vsiga or Vsigb is superposed upon this DC bias voltage $V_0$. Accordingly, the phase shift of the optical signal propagating through the first optical waveguide 23 and the phase shift of the optical signal propagating through the second optical waveguide 24 change within the range including $\phi_0$.

The optical loss of the optical signal propagating through the first optical waveguide 23 and the optical loss of the optical signal propagating through the second optical waveguide 24 are equal to each other and they are both $L_0$. Consequently, the optical signal introduced into the input port IP2a and the optical signal introduced into the input port IP2b of the optical multiplexer 22 have the same intensity, resulting in a high extinction ratio.

Figure 8:
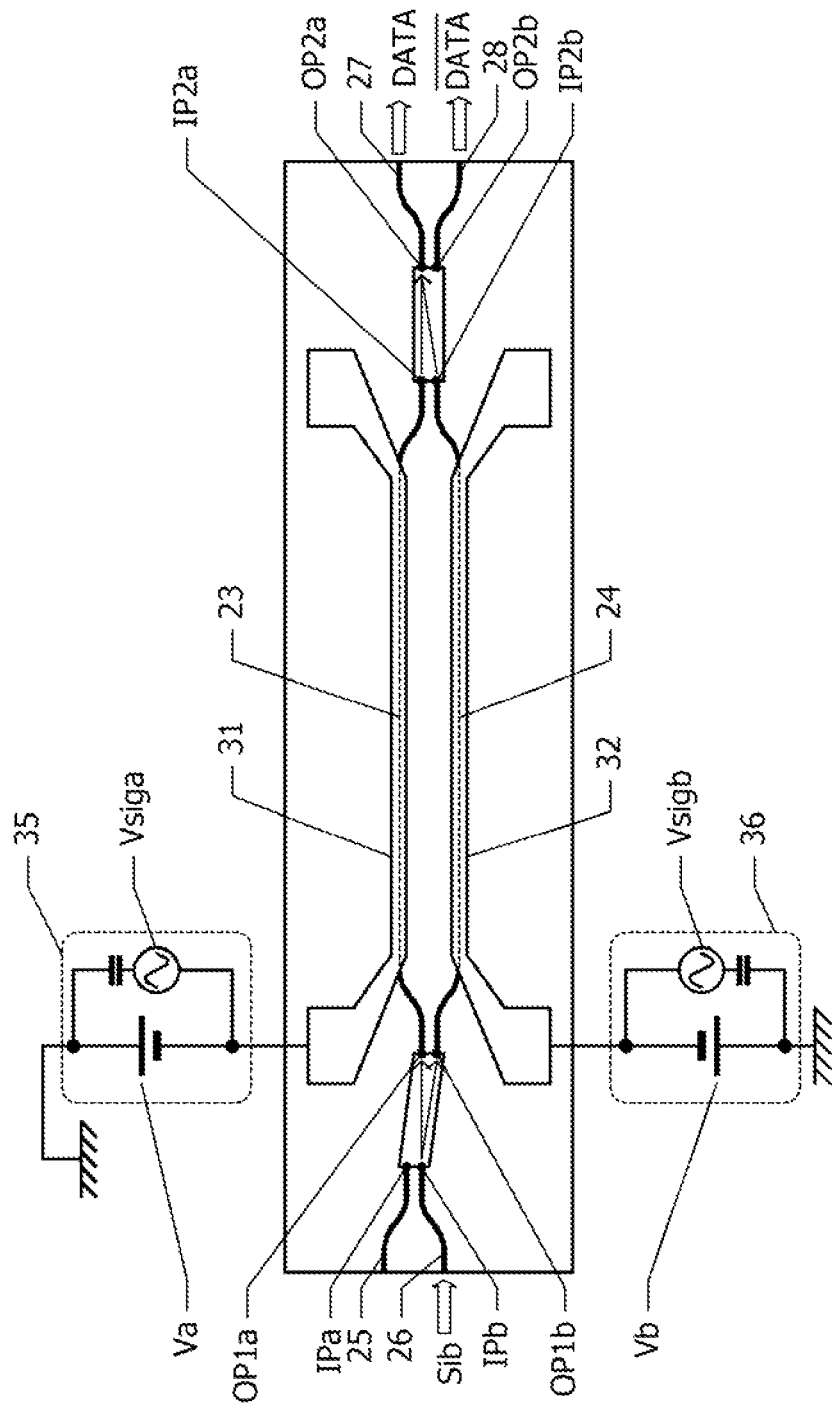
FIG. 8 is a plan view that illustrates a path of the optical signal propagation in the optical semiconductor device according to Embodiment 1 during operation with negative chirp modulation.
Figure 9:
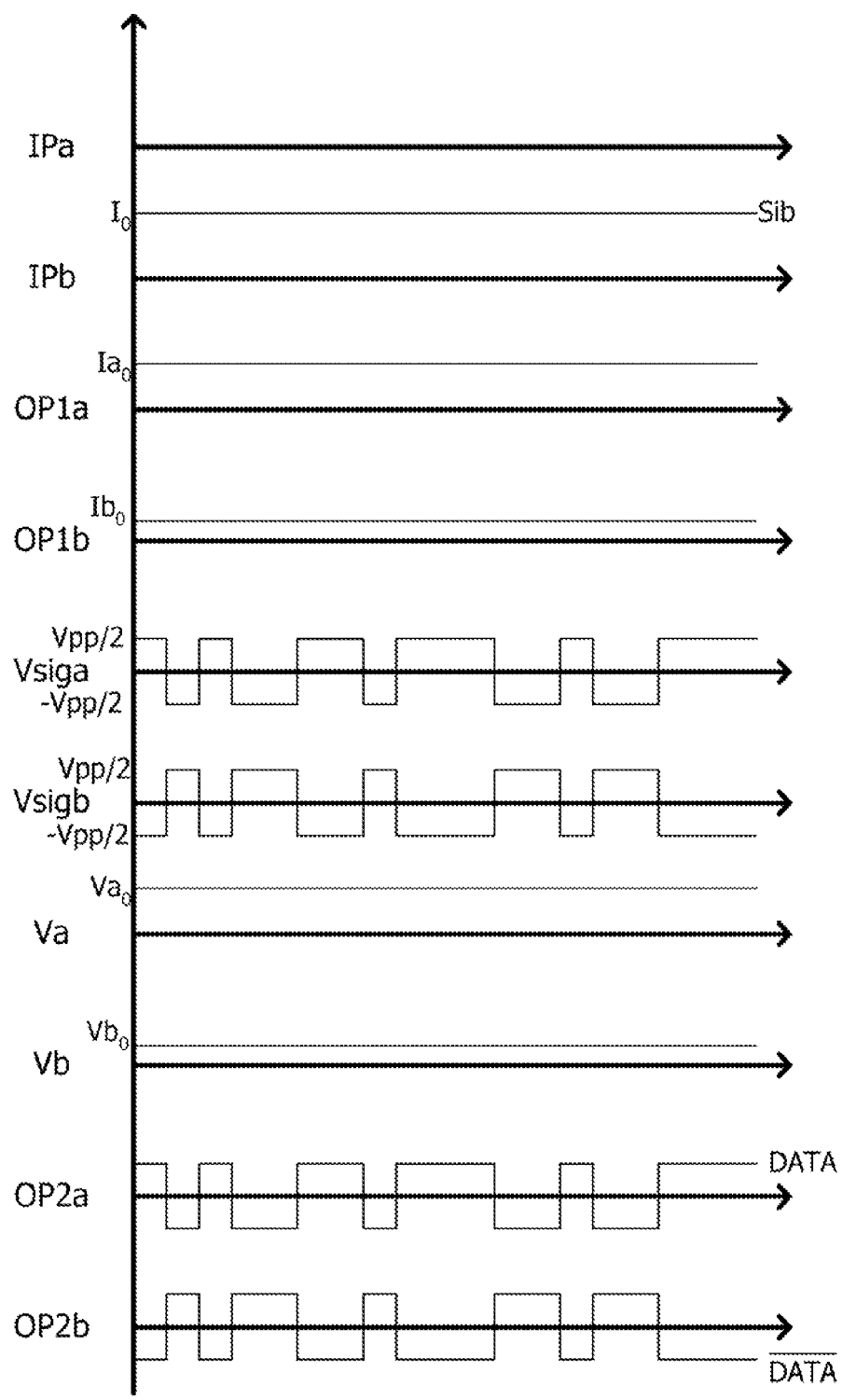
FIG. 9 is a timing chart of modulation signals and optical signals in the optical semiconductor device according to Embodiment 1 during operation with negative chirp modulation.

FIG. 8 illustrates a path of the propagation of the optical signal in the case of negative chirp modulation, and FIG. 9 illustrates a timing chart of the optical signals and modulated signals. The optical signal Sib is introduced into the second input port IPb through the second input waveguide 26. No optical signal is introduced into the first input port IPa. The intensity of the optical signal Sib is denoted by $I_0$.

Optical Signals having intensity of $Ia_0$ and $Ib_0$ come out from the first output port OP1a and the second output port OP1b, respectively. Here, the following relation: $Ia_0 > Ib_0$ is true. The DC bias voltages Va and Vb are $Va_0$ and $Vb_0$, respectively. Here, the following relation: $Va_0 > Vb_0$ is true. The modulation signal voltages Vsiga and Vsigb are alternating voltages in opposite phases with the same amplitude Vpp.

The third output port OP2a outputs the optical signal DATA. The fourth output port OP2b outputs inversion signal (overbar of DATA) of the optical signal DATA.

Figure 10A:
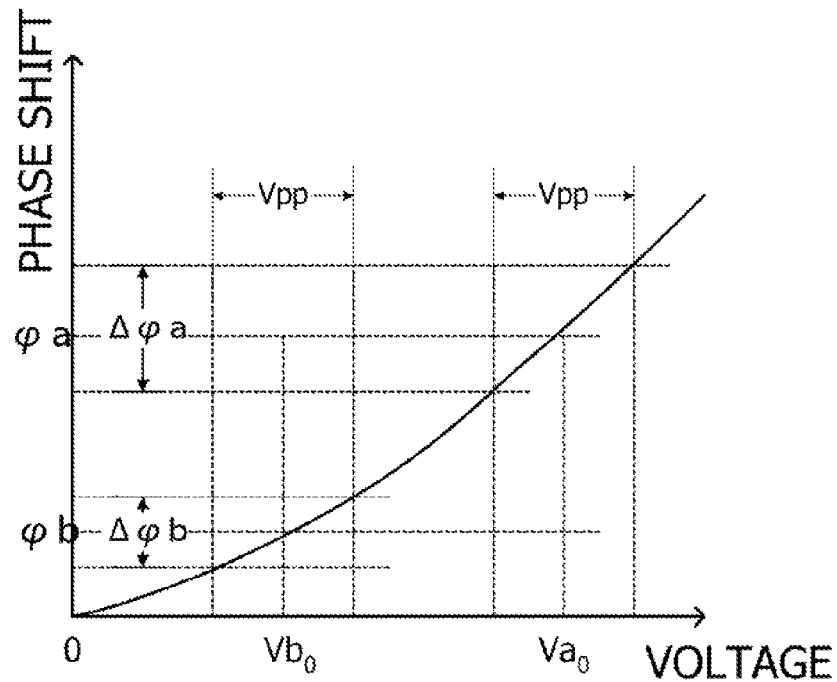
FIG. 10A is a graph illustrating the voltage dependency of the phase shifts in the first and the second optical waveguide during operation with negative chirp modulation.
Figure 10B:
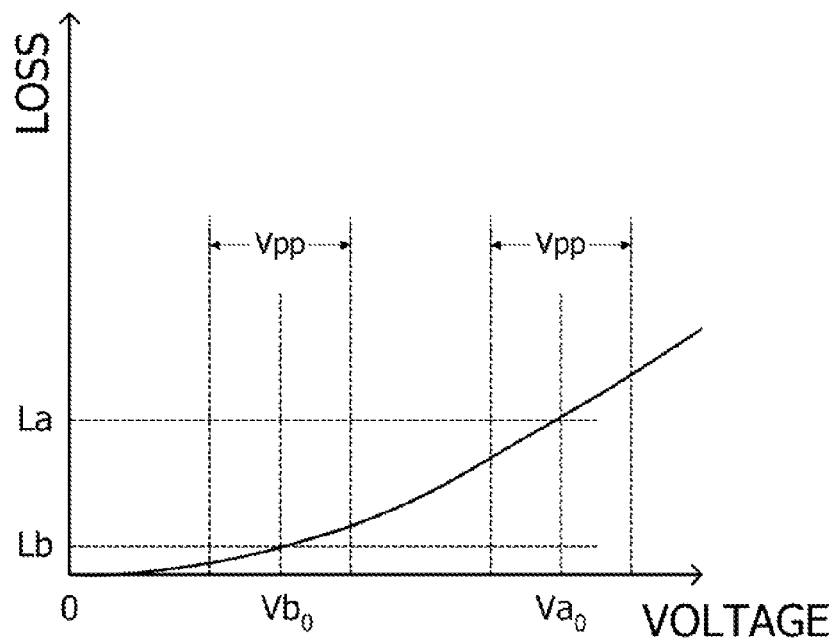
FIG. 10B is a graph illustrating the voltage dependency of the optical loss.

FIG. 10A illustrates typical phase shift in the first optical waveguide 23 and the second optical waveguide 24 with reference to the voltage-free condition. FIG. 10B illustrates a typical optical loss in the first optical waveguide 23 and the second optical waveguide 24. The DC bias voltage $Va_0$ applied to the first modulation electrode 31 is larger than the DC bias voltage $Vb_0$ applied to the second modulation electrode 32. The phase shifts that take place when direct current bias voltages $Va_0$ and $Vb_0$ are applied are denoted hereafter by $\phi a$ and $\phi b$, respectively. Here, $\phi a$ is larger than $\phi b$.

The modulation voltages Vsiga and Vsigb, both with amplitude of Vpp, are superimposed upon the DC bias voltages $Va_0$ and $Vb_0$, respectively. Consequently, the phase shift of the optical signal propagating in the first optical waveguide 23 changes centering on a point $\phi a$. The variation range (magnitude of phase modulation) is hereafter denoted by $\Delta\phi a$. The phase shift of the optical signal propagating in the second optical waveguide 24 changes centering on a point $\phi b$. The variation range (magnitude of phase modulation) is hereafter denoted by $\Delta\phi b$. Negative chirp modulation with a parameter a of about −0.7 can be achieved by adjusting the ratio of the magnitude of phase modulation $\Delta\phi a$ to $\Delta\phi b$ equal to 0.85:0.15.

Here, La and Lb are defined as the optical losses that are caused in the optical signals propagating in the first optical waveguide 23 and the second optical waveguide 24 when the applied voltages are $Va_0$ and $Vb_0$, respectively. Here, the loss La is larger than the loss Lb. When the intensity of the optical signal that is output from the first output port OP1a is equal to that from the second output port OP1b, the difference in intensity between the two optical signals introduced into the optical multiplexer 22 increases, reflecting the difference between the losses La and Lb. This causes a decrease in the extinction ratio.

In Embodiment 1, the intensity $Ia_0$ of the optical signal that is output from the first output port OP1a is larger than the intensity $Ib_0$ of the optical signal that is output from the second output port OP1b. Accordingly, the difference between the intensity of the optical signal after propagating through the first optical waveguide 31 generating larger loss and the intensity of the optical signal after propagating through the second optical waveguide 32 generating smaller loss can be decreased. Thus, the difference in intensity between the two optical signals introduced into the optical multiplexer 22 can be decreased. This serves to achieve a high extinction ratio.

To achieve a high extinction ratio, it is preferable that the intensity of the optical signal which is obtained by causing the loss La to the optical signal having an intensity of $Ia_0$ that is output from the first optical waveguide 23 is equal to the intensity of the optical signal which is obtained by causing the loss Lb to the optical signal having an intensity of $Ib_0$ that is output from the second optical waveguide 24. Here, even if the two intensities are not exactly the same, the extinction ratio can be improved in the case where the difference in intensity between the optical signals introduced into the two input ports IP2a and IP2b of the optical multiplexer 22 is smaller than the difference between the two intensities that would take place when the demultiplexing ratio of the optical demultiplexer 21 is equal to 1:1.

To perform negative chirp modulation with a parameter α of about −0.7, it is required that the ratio of the magnitude of phase modulation $\Delta\phi a$ to $\Delta\phi b$ illustrated in FIG. 10A is equal to 0.85:0.15. In an optical semiconductor device as illustrated in Embodiment 1 where the wavelength of the optical signal and the amplitude Vpp of the modulation voltage are 1.55 μm and 1.0V, respectively, the ratio of Δϕa to Δϕb becomes equal to 0.85:0.15 when the DC bias voltages $Va_0$ and $Vb_0$ are adjusted to 5.17V and 1.51V, respectively.

This is achieved by the difference in intensity between the optical signals coming from the first output port OP1a and the second output port OP1b of the optical demultiplexer 21 adjusted so as to compensate the difference between the loss La in the first optical waveguide 23 and the loss Lb in the second optical waveguide 24. In the case of the optical semiconductor device according to Embodiment 1, the ratio of the intensity of the optical signal coming from the first output port OP1a to that coming from the second output port OP1b is adjusted to 52.5:47.5. In other words, it is preferable that the intensity of the optical signal coming from the first output port OP1a (intensity ratio) with reference to the intensity of the optical signal coming from the second output port OP1b is adjusted to 0.4 dB. Thus, a favorable extinction ratio can be achieved by shifting the branching ratio in the optical demultiplexer 21 from 1:1.

In the optical semiconductor device according to Embodiment 1, furthermore, it is not necessary to change over the amplitudes of modulation voltages Vsiga and Vsigb between zero chirp modulation and negative chirp modulation. Thus, the modulation voltage generation circuit for zero chirp modulation and the modulation voltage generation circuit for negative chirp modulation can be realized in common.

Figure 11:
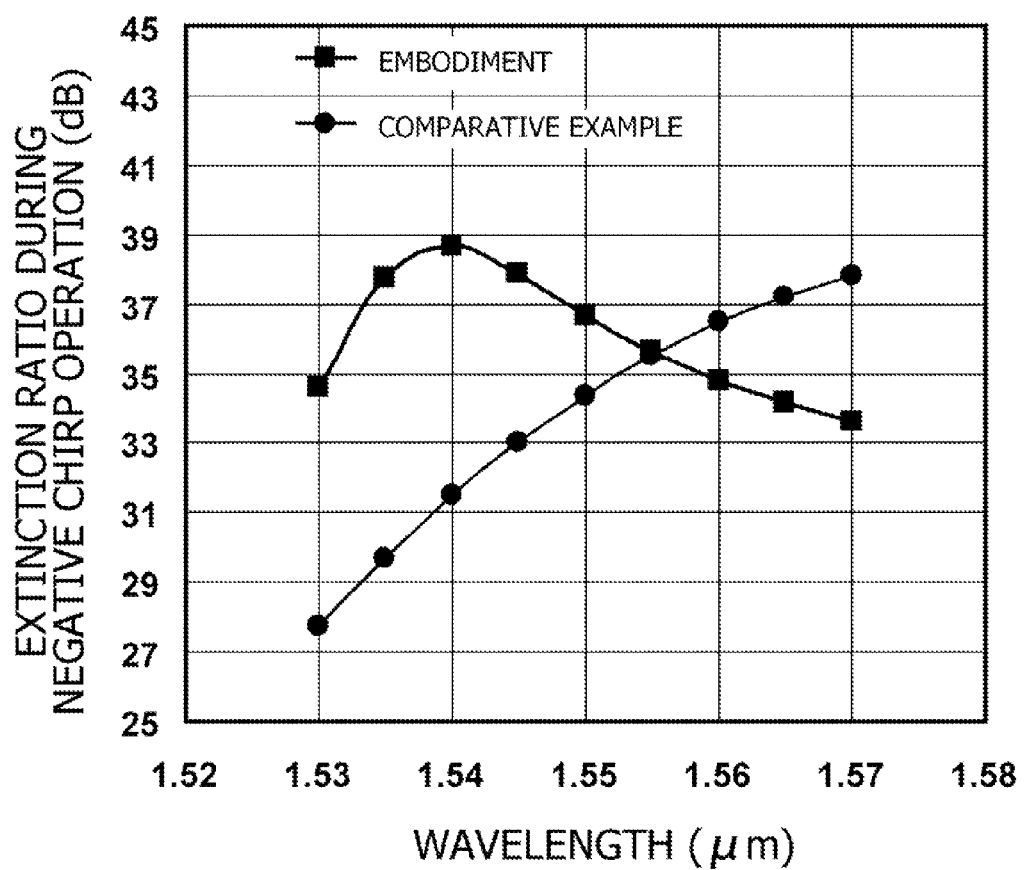
FIG. 11 is a graph illustrating the wavelength dependency on the extinction ratio during operation with negative chirp modulation.

FIG. 11 illustrates the wavelength dependency of the extinction ratio during negative chirp operation. The horizontal axis represents the wavelength in the unit of "μm" and the longitudinal axis represents the extinction ratio in the unit of "dB". In the figure, the squares represent the extinction ratio of the optical semiconductor device according to Embodiment 1 and the circles represent the extinction ratio in the case where the optical signal coming from the first and the second output port OP1a and OP1b of the optical demultiplexer 21 have the same intensity (comparative example). It has been found that in Embodiment 1, an extinction ratio equal to or larger than 33.5 dB is achieved in the wavelength range of 1.53 μm to 1.57 μm. As compared with this, extinction ratio decreases to about 28 dB when the wavelength is 1.53 μm in the comparative example. As in Embodiment 1, the decrease in extinction ratio that can take place during negative chirp modulation can be prevented by adjusting the intensity ratio of the optical signals coming from the two output ports OP1a and OP1b of the optical demultiplexer 21 to about 0.4 dB.

In Embodiment 1, the substrate 20 is of an n-type InP semiconductor material and the cladding layer, core layer, etc. are of an InP-based semiconductor material, but other semiconductor materials may be used. For instance, a core layer of an InAlGaAs-based semiconductor material may be formed on an InP substrate. Furthermore, the core layer in Embodiment 1 has a MQW structure, but it may have other structures such as, for instance, quantum wire structure, quantum dot structure, and bulk structure. In addition, the modulation electrode has a micro-strip line structure in Embodiment 1, but it may have a coplanar structure.

Embodiment 2

Figure 12:
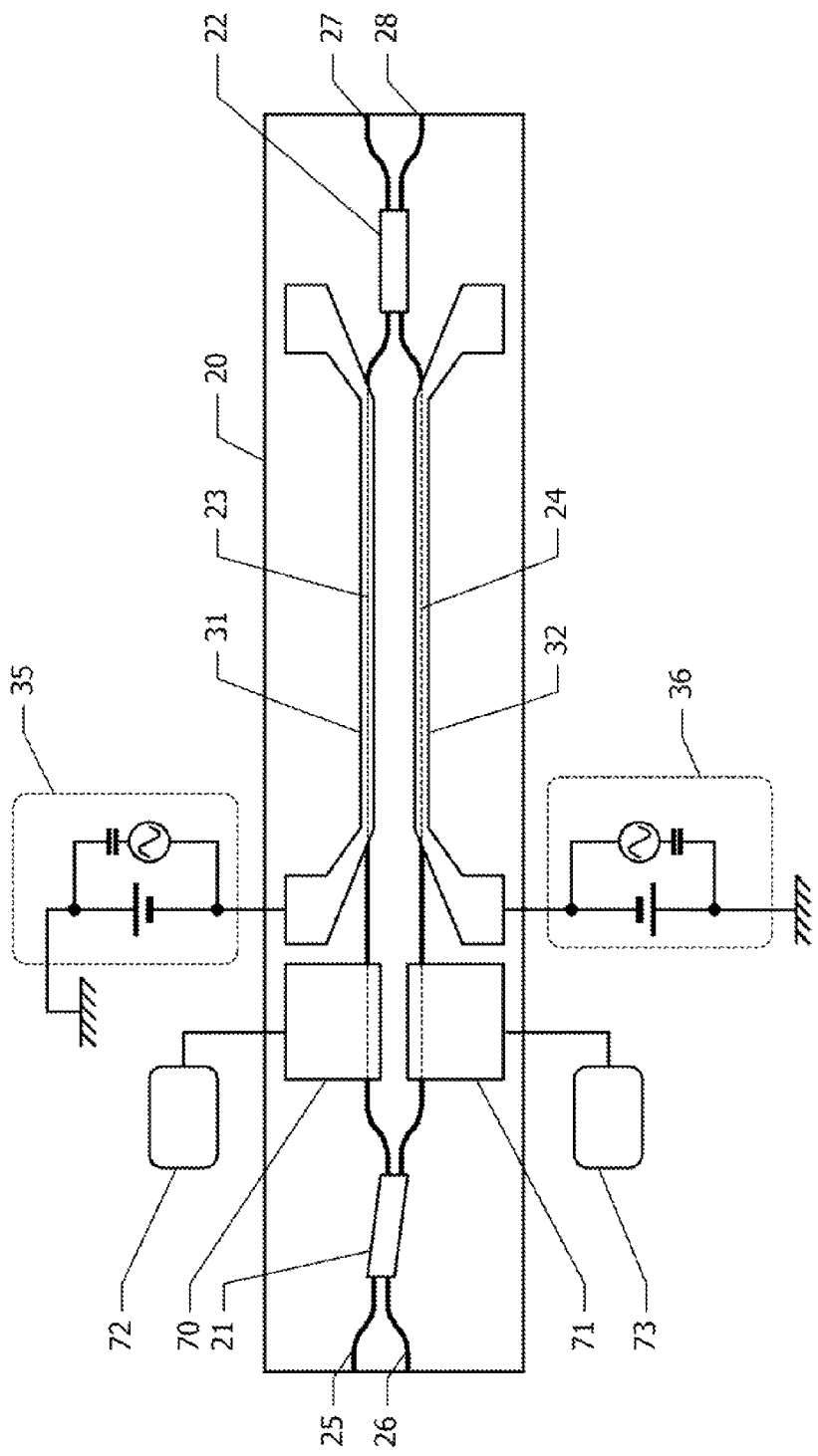
FIG. 12 is a plan view of an optical semiconductor device according to Embodiment 2.

FIG. 12 is a plan view of an optical semiconductor device according to Embodiment 2. Described below are differences from the optical semiconductor device according to Embodiment 1 illustrated in FIG. 1, omitting description of the identical structural features.

A first initial phase adjustment electrode 70 is provided on the first optical waveguide 23 that extends from the optical demultiplexer 21 to the first modulation electrode 31, and a second initial phase adjustment electrode 71 is provided on the second optical waveguide 24 that extends from the optical demultiplexer 21 to the second modulation electrode 32. Voltage applying circuits 72 and 73 for initial phase adjustment are provided to apply a DC voltage to the first and the second initial phase adjustment electrodes 70 and 71, respectively.

By applying a required DC voltage to the first and the second initial phase adjustment electrodes 70 and 71, it is possible to give an initial phase difference to the optical signals propagating through the first optical waveguide 23 and the second optical waveguide 24. For instance, it is possible to give an initial phase difference so as to compensate an unexpected phase difference resulting from fluctuations in width of the first and the second optical waveguide 23 and 24 or deviations in size of the optical multiplexer 22 from design values.

The first and the second initial phase adjustment electrodes 70 and 71 may be formed simultaneously with the first and the second modulation electrodes 31 and 32.

In Embodiment 1, the optical signal is output from the second output waveguide 28 during zero chirp modulation as illustrated in FIG. 5 while the optical signal is output from the first output waveguide 27 during negative chirp modulation as illustrated in FIG. 8. By adjusting the initial phase difference, it is possible to allow the optical signal to be output from the second output waveguide 28 during negative chirp operation as well. If an unignorable optical loss results from adjustment of the initial phase difference, this optical loss may be taken into consideration when setting the demultiplexing ratio of the optical demultiplexer 21.

Embodiment 3

Figure 13:
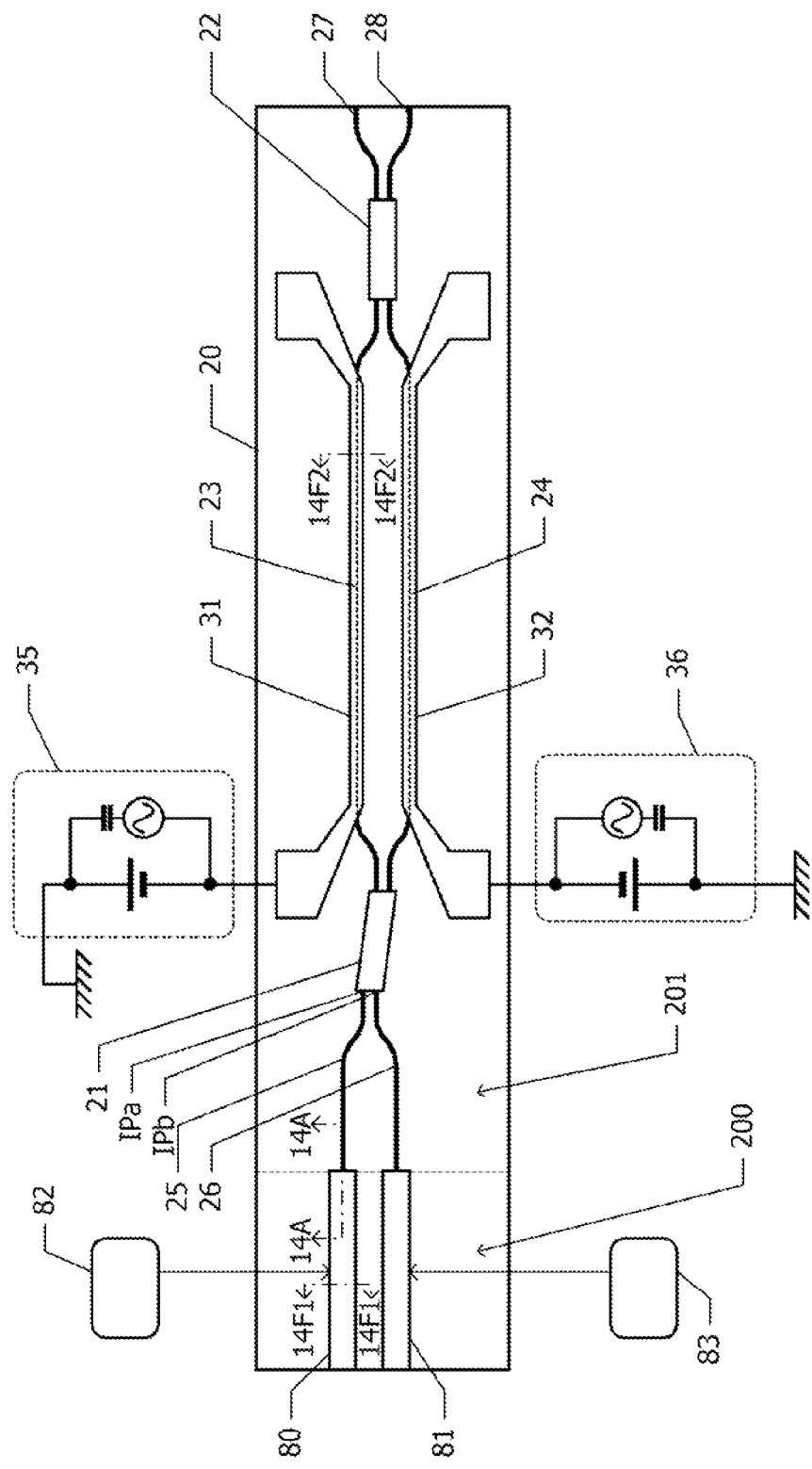
FIG. 13 is a plan view of an optical semiconductor device according to Embodiment 3.

FIG. 13 is a plan view of an optical semiconductor device according to Embodiment 3. Described below are differences from the optical semiconductor device according to Embodiment 1 illustrated in FIG. 1, omitting description of the identical structural features.

The surface of the substrate 20 is divided into a laser region 200 and a modulator region 201. A first semiconductor laser device 80 and a second semiconductor laser device 81 are formed in the laser region 200 of the substrate 20. The modulator region 201 contains the first and the second input waveguide 25 and 26, the optical demultiplexer 21, the first and the second optical waveguide 23 and 24, the first and the second modulation electrode 31 and 32, the optical multiplexer 22, and the first and the second output waveguide 27 and 28 that are included in Embodiment 1 as illustrated in FIG. 1.

The outgoing end of the first semiconductor laser device 80 is connected to the first input port IPa of the optical demultiplexer 21 via the first input waveguide 25, while the outgoing end of the second semiconductor laser device 81 is connected to the second input port IPb of the optical demultiplexer 21 via the second input waveguide 26.

The driver circuits 82 and 83 drive the first semiconductor laser device 80 and the second semiconductor laser device 81, respectively. The state where the optical signal is output from the first semiconductor laser device 80 corresponds to zero chirp modulation as illustrated in FIG. 3B, while the state where the optical signal is output from the second semiconductor laser device 81 corresponds to negative chirp modulation as illustrated in FIG. 3C.

Figure 14D:
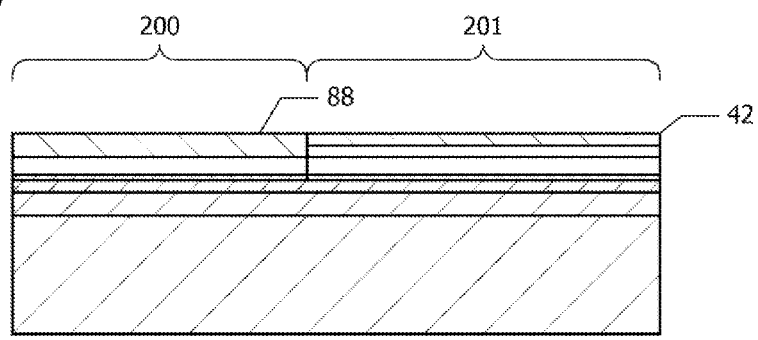

A method for manufacturing the optical semiconductor device according to Embodiment 3 is described below with reference to FIGS. 14A to 14N1 and 14N2. FIGS. 14A to 14E correspond to the cross sections along the dashed-dotted line 14A-14A given in FIG. 13. FIGS. 14F1, 14G1, ... 14N1 correspond to the cross sections along the dashed-dotted line 14F1-14F1 given in FIG. 13, and FIGS. 14F2, 14G2, ... 14N2 correspond to the cross sections along the dashed-dotted line 14F2-14F2 given in FIG. 13. Descriptions regarding the steps that are identical with those illustrated in FIGS. 2A to FIG. 2L for the manufacturing method according to Embodiment 1 are omitted.

As illustrated in FIG. 14A, a lower cladding layer 40 of n-type InP with a thickness of 200 nm is formed on the substrate 20. A diffraction grating layer 85 is formed on the lower cladding layer 40. The diffraction grating layer 85 is made of n-type InGaAsP with a transition wavelength of 1.2 µm and has a thickness of 70 nm. A diffraction grating with a period of 240 nm is formed in the laser region 200 of the diffraction grating layer 85. Electron beam exposure and dry etching may be used for formation of the diffraction grating.

A spacer layer 86 of n-type InP with a thickness of 50 nm is formed on the diffraction grating layer 85. An active layer 87 is formed on the spacer layer 86. The active layer 87 has a layered structure consisting of a multiple quantum well (MQW) layer sandwiched between separate confinement heterostructure (SCH) layers. The SCH layer is made of undoped InGaAsP with a transition wavelength of 1.15 µm and has a thickness of 12.5 nm. The MQW layer has a layered structure consisting of nine barrier layers of undoped InGaAsP each with a thickness of 15 nm and eight well layers of undoped InGaAsP each with a thickness of 5 nm that are stacked alternately. The MQW layer has a photoluminescence (PL) wavelength of, for instance, 1.55 µm.

An upper cladding layer 88 of p-type InP with a thickness of 200 nm is formed on the active layer 87.

A mask pattern 89 of silicon oxide etc. is formed on the upper cladding layer 88. The mask pattern 89 covers the upper cladding layer 88 in the laser region 200 and exposes the upper cladding layer 88 in the modulator region 201.

As illustrated in FIG. 14B, the upper cladding layer 88, the active layer 87, and the spacer layer 86 are etched using the mask pattern 89 as an etching mask. The wet etching process, for instance, may be used for this etching. The diffraction grating layer 85 is exposed in the modulator region 201.

As illustrated in FIG. 14C, a core layer 41 and an upper first cladding layer 42 are selectively grown on the diffraction grating layer 85 in the modulator region 201 using the mask pattern 89 as a mask for selective growth. The core layer 41 and the upper first cladding layer 42 have the same structure as the core layer 41 and the upper first cladding layer 42 in Embodiment 1 illustrated in FIG. 2A. The core layer 41 and the active layer 87 are mutually connected by a butt joint structure.

As illustrated in FIG. 14D, the mask pattern 89 (FIG. 14C) is removed. Consequently, the upper cladding layer 88 is exposed.

Figure 14E:
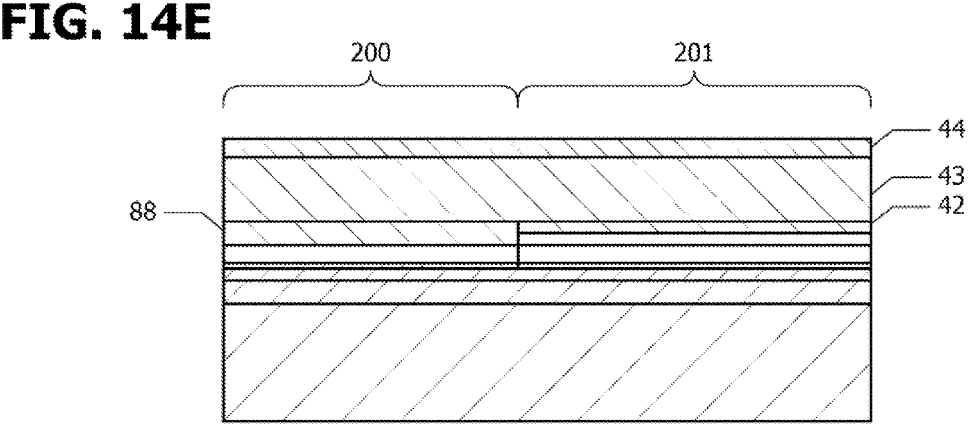

As illustrated in FIG. 14E, an upper second cladding layer 43 of p-type InP with a thickness of 1,500 nm is formed on the upper cladding layer 88 and the upper first cladding layer 42. A contact layer 44 of p-type InGaAs with a thickness of 300 nm is formed on the upper second cladding layer 43.

As illustrated in FIGS. 14F1 and 14F2, a mask pattern 90 of silicon oxide etc. is formed on the contact layer 44. The mask pattern 90 has a planar shape corresponding to that of the first and the second semiconductor laser device 80 and 81, the first and the second input waveguide 25 and 26, the optical demultiplexer 21, the first and the second optical waveguide 23 and 24, the optical multiplexer 22, and the first and the second output waveguide 27 and 28 illustrated in FIG. 13.

The layers from the contact layer 44 down to the surface layer of the substrate 20 are etched using the mask pattern 90 as an etching mask. This etching is carried out by the reactive ion etching using inductively-coupled plasma (ICP-RIE). A mesa structure 100 is formed in the laser region 200, and a mesa structure 50 is formed in the modulator region 201. The mesa structures 50 and 100 have a height of about 3 µm.

As illustrated in FIGS. 14G1 and 14G2, the surface of the substrate 20 in the modulator region 201 and the surface of the mesa structure 50 are covered with a mask pattern 103 of silicon nitride. The mask pattern 103 is formed by depositing a silicon nitride film over the entire surface and then removing the silicon nitride film in the laser region 200.

As illustrated in FIGS. 14H1 and 14H2, an embedding material 104 of semi-insulating InP is selectively grown on the substrate 20 using the mask patterns 90 and 103 as a mask for selective growth. The spaces on both sides of the mesa structure 100 are filled with the embedding material 104. The embedding material 104 is not formed in the modulator region 201.

As illustrated in FIGS. 14I1 and 14I2, the mask patterns 90 and 103 (FIGS. 14H1 and 14H2) are removed using a hydrofluoric acid based etchant. The contact layer 44 and the embedding material 104 are exposed in the laser region 200, and the substrate 20 and the mesa structure 50 are exposed in the modulator region 201.

As illustrated in FIGS. 14J1 and 14J2, the surface of the embedding material 104 and the contact layer 44 in the laser region 200 and the surface of the substrate 20 and the mesa structure 50 in the modulator region 201 are covered with a passivation film 52 of silicon oxide. Furthermore, an embedding material 53 of a low dielectric constant material is formed on the passivation film 52 by an appropriate technique such as spin coating. BCB etc. may be used as material for the embedding material 53 as in Embodiment 1. The space lateral to the mesa structure 50 is filled with the embedding material 53.

As illustrated in FIGS. 14K1 and 14K2, the surface layer of the embedding material 53 is etched back using RIE etc. The passivation film 52 is exposed in the laser region 200. In the modulator region 201, the passivation film 52 on the mesa structure 50 is exposed. The embedding material 53 is left in the space lateral to the mesa structure 50.

As illustrated in FIGS. 14L1 and 14L2, a resist film 110 is formed on the passivation film 52 and the contact layer 44 in the laser region 200 and the passivation film 52 (FIG. 14K2) and the embedding material 53 in the modulator region 201. Openings 110A are formed in this resist film 110. The openings 110A have planar shapes corresponding to those of the electrodes of the first and the second semiconductor laser device 80 and 81 and those of the first and the second modulation electrode 31 and 32 illustrated in FIG. 13. The passivation films 52 exposed at the bottom of the openings 110A are removed by wet etching.

As illustrated in FIGS. 14M1 and 14M2, an electrically conductive film 57 is formed on the resist film 110 and the bottom faces of the openings 110A. The electrically conductive film 57 has, for instance, an Au/Zn/Au three layer structure that is formed by vacuum deposition. Subsequently, the resist film 110 is removed along with the electrically conductive film 57 deposited thereon. Thus, the electrically conductive films 57 are left only on the bottom faces of the openings 110A.

As illustrated in FIGS. 14N1 and 14N2, a seed layer 58 and an Au film 60 are formed on the electrically conductive films 57. The formation procedure for the seed layer 58 and the Au film 60 is the same as that for the conductive film 57, the seed layer 58, and the Au film 60 in Embodiment 1 illustrated in FIGS. 2H to 2K. Thus, the upper electrode 80A for the first semiconductor laser device 80 that consists of the electrically conductive film 57, the seed layer 58, and the Au film 60 is formed in the laser region 200. Simultaneously, the upper electrode for the second semiconductor laser device 81 (FIG. 13) is also formed. In the modulator region 201, the first modulation electrode 31 and the second modulation electrode 32 (FIG. 13) are formed as in Embodiment 1.

The back face of the substrate 20 is polished and then an electrically conductive film 65 and an Au film 65 are formed by the same procedure as in Embodiment 1 in FIG. 9L.

In Embodiment 3, zero chirp modulation and negative chirp modulation can be performed as in Embodiment 1. It is also possible to depress the decrease in the extinction ratio during negative chirp modulation. Either zero chirp modulation or negative chirp modulation is activated by selecting either the first semiconductor laser device 80 or the second semiconductor laser device 81 to be driven.

Embodiment 4

Figure 15:
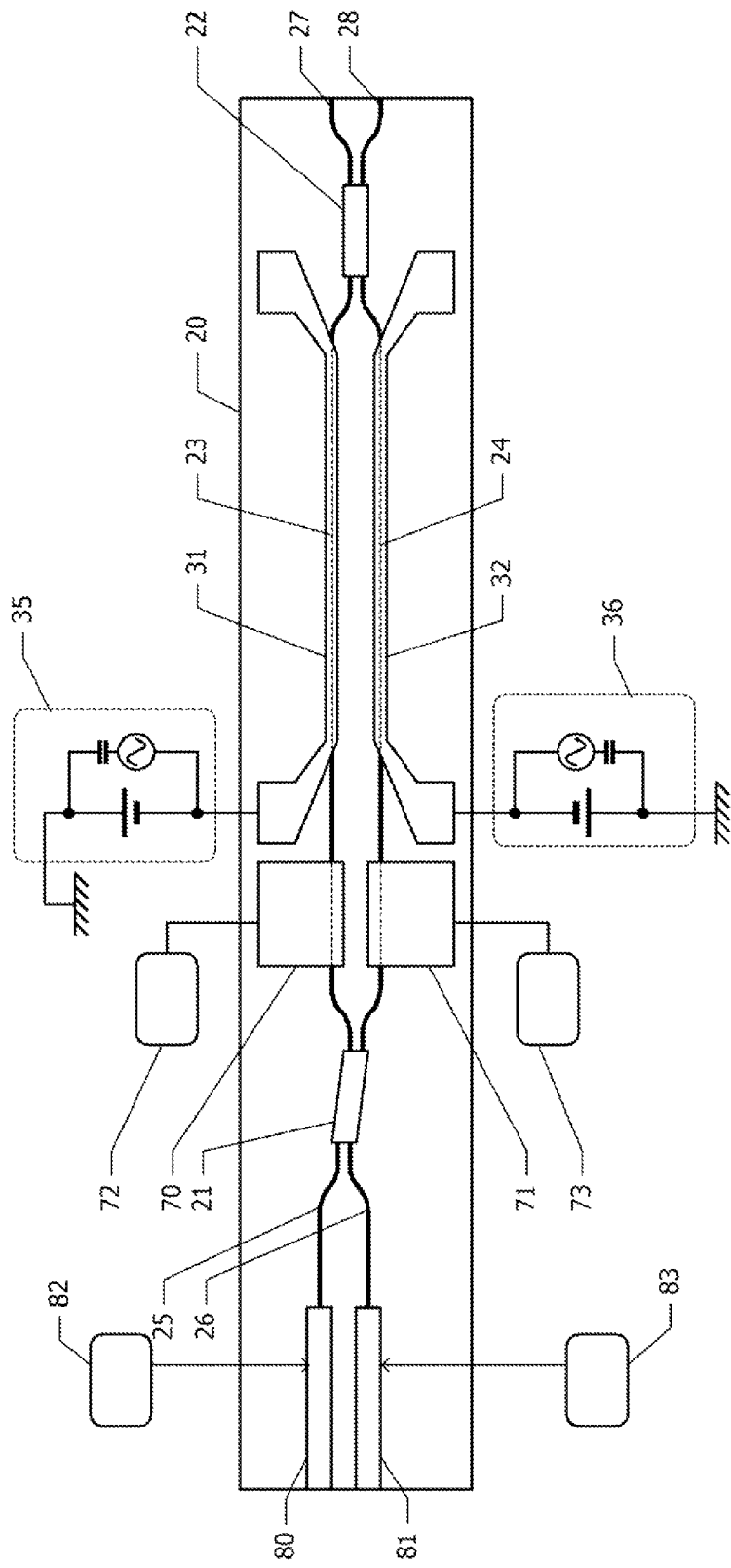
FIG. 15 is a plan view of an optical semiconductor device according to Embodiment 4.

FIG. 15 is a plan view of an optical semiconductor device according to Embodiment 4. Described below are differences from the optical semiconductor device according to Embodiment 3 illustrated in FIG. 13, omitting description of the identical structural features.

In Embodiment 4, the first initial phase adjustment electrode 70 and the second initial phase adjustment electrode 71 are formed as in Embodiment 2 illustrated in FIG. 12. In addition, voltage applying circuits 72 and 73 are provided for initial phase adjustment.

In Embodiment 4, it is possible as in Embodiment 2 to give an initial phase difference so as to compensate an unexpected phase difference resulting from fluctuations in width of the first and the second optical waveguide 23 and 24 or deviations in size of the optical multiplexer 22 from design values. By adjusting the initial phase difference, it is also possible to allow the optical signal to be output from the same one waveguide selected from the first output waveguide 27 and the second output waveguide 28 both during zero chirp modulation and during negative chirp modulation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical semiconductor device comprising:
    an optical demultiplexer having a first and a second input ports and a first and a second output ports wherein intensity of an optical signal that is output from the first output port and an optical signal that is output from the second output port are equal to each other when an optical signal is introduced into the first input port whereas intensity of an optical signal that is output from the first output port is larger than intensity of an optical signal that is output from the second output port when an optical signal is introduced into the second input port;
    an optical multiplexer having a third and a fourth input ports and a third and a fourth output ports;
    a first optical waveguide of semiconductor to connect the first output port to the third input port;
    a second optical waveguide of semiconductor to connect the second output port to the fourth input port;
    a first modulation electrode to apply an electric field to the first optical waveguide so as to cause changes in the optical path length of the first optical waveguide; and
    a second modulation electrode to apply an electric field to the second optical waveguide so as to cause changes in the optical path length of the second optical waveguide.

2. The optical semiconductor device according to claim 1 further comprising a substrate having the optical demultiplexer, the optical multiplexer, the first optical waveguide, and the second optical waveguide formed thereon wherein:
    the optical demultiplexer contains a multimode interference waveguide having a planar shape of parallelogram apex angles of which are not right angles; and
    the first input port and the second input port being located on an input side, which is one of the sides of the multimode interference waveguide, and the first output port and the second output port being located on an output side, which is another side parallel to the input side.

3. The optical semiconductor device according to claim 2 wherein the first output port and the second output port are offset from both the line extended from the first input port in a direction perpendicular to the input side and the line extended from the second input port in a direction perpendicular to the input side.

4. The optical semiconductor device according to claim 2 further comprising driver circuits to apply modulation signals to the first modulation electrode and the second modulation electrode.

5. The optical semiconductor device according to claim 4 wherein the driver circuits apply modulation signals to the first modulation electrode and the second modulation electrode in such a manner that a DC voltage component of the modulation signal applied to the first modulation electrode is equal to that of the modulation signal applied to the second modulation electrode when the optical signal is introduced into the first input port, whereas the DC voltage component of the modulation signal applied to the first modulation electrode is larger than the DC voltage component of the modulation signal applied to the second modulation electrode when the optical signal is introduced into the second input port.

6. The optical semiconductor device according to claim 4 wherein the driver circuits apply modulation signals to the first modulation electrode and the second modulation electrode in such a manner that with reference to voltage-free state, a phase shift of the optical signal propagating in the first optical waveguide is equal to a phase shift of the optical signal propagating in the second optical waveguide when the optical signal is introduced into the first input port, whereas the phase shift of the optical signal propagating in the first optical waveguide is larger than the phase shift of the optical signal propagating in the second optical waveguide when the optical signal is introduced into the second input port.

7. The optical semiconductor device according to claim 4 wherein the alternating voltage components of the modulation signals applied by the driver circuits to the first modulation electrode and the second modulation electrode are in mutually opposite phases and have a same amplitude.

8. The optical semiconductor device according to claim 2 further comprising an initial phase adjustment electrode to apply a voltage for initial phase adjustment to at least either the first optical waveguide or the second optical waveguide.

9. The optical semiconductor device according to claim 2 further comprising:
- a first semiconductor laser formed on the substrate to introduce the optical signal into the first input port, and
- a second semiconductor laser formed on the substrate to introduce the optical signal into the second input port.

10. The optical semiconductor device according to claim 1 wherein when voltages are applied to the first modulation electrode and the second modulation electrode, the first optical waveguide and the second optical waveguide change in refractive index due to electrooptical effect and change in optical path length to cause change in an interference state in the optical multiplexer.

* * * * *